United States Patent
Erceg et al.

(10) Patent No.: US 10,160,606 B2
(45) Date of Patent: Dec. 25, 2018

(54) CONVEYOR SYSTEM WHEEL FAILURE DETECTION AND REMEDIATION

(71) Applicant: Mantissa Corporation, Charlotte, NC (US)

(72) Inventors: David Patrick Erceg, Concord, NC (US); J. David Fortenbery, Charlotte, NC (US); Daniel H. Weckerle, Charlotte, NC (US); Gonzalo Sotelo, Charlotte, NC (US); LeRoy A. Winkler, Charlotte, NC (US)

(73) Assignee: Mantissa Corporation, Charlotte, NC (US)

( * ) Notice: Subject to any disclaimer, the term of this patent is extended or adjusted under 35 U.S.C. 154(b) by 0 days.

(21) Appl. No.: 15/507,632

(22) PCT Filed: Aug. 31, 2015

(86) PCT No.: PCT/US2015/047684
§ 371 (c)(1),
(2) Date: Feb. 28, 2017

(87) PCT Pub. No.: WO2016/033583
PCT Pub. Date: Mar. 3, 2016

(65) Prior Publication Data
US 2017/0283183 A1     Oct. 5, 2017

Related U.S. Application Data

(60) Provisional application No. 62/043,781, filed on Aug. 29, 2014.

(51) Int. Cl.
*B65G 43/02*     (2006.01)
*B65G 17/38*     (2006.01)
(Continued)

(52) U.S. Cl.
CPC ............. *B65G 43/02* (2013.01); *B65G 17/38* (2013.01); *B65G 47/96* (2013.01); *B65G 47/962* (2013.01);
(Continued)

(58) Field of Classification Search
CPC ...... B65G 47/962; B65G 43/02; B65G 17/38; G01B 11/0608
(Continued)

(56) References Cited

U.S. PATENT DOCUMENTS

| | | | |
|---|---|---|---|
| 2,543,368 A | 2/1951 | Jones et al. | 198/840 |
| 2,757,786 A | 8/1956 | Grebe | 198/821 |

(Continued)

FOREIGN PATENT DOCUMENTS

| | | | |
|---|---|---|---|
| DE | 0969122 | 4/1958 | 198/822 |
| DE | 3050102 | 4/1982 | |

(Continued)

OTHER PUBLICATIONS

Minutes of the Mailers Technical Committee, Sep. 16-17, 1998.
Mannesmann Dematic, Rapistand Systems, 2000.

*Primary Examiner* — Douglas A Hess
(74) *Attorney, Agent, or Firm* — MacCord Mason PLLC

(57) ABSTRACT

A sorting conveyor for transporting objects and unloading objects at one or more unloading stations adjacent the conveyor. The sorting conveyor includes a conveyor track and a train of conveyor carts connected end-to-end. At least one of the conveyor carts may include a frame base for engaging the conveyer track; a conveyor surface for holding the objects; and a conveyor support for supporting the conveyor surface above the frame base. A wear guard associated with the axle support prevents track wear. A track wear prevention system includes a wear guard and a height (Continued)

detection module. Systems and methods for track wear prevention are also disclosed.

18 Claims, 23 Drawing Sheets

(51) Int. Cl.
 *B65G 47/96* (2006.01)
 *G01B 11/06* (2006.01)
(52) U.S. Cl.
 CPC ...... *G01B 11/0608* (2013.01); *B65G 2207/48* (2013.01)
(58) Field of Classification Search
 USPC ........................................ 198/370.01, 370.04
 See application file for complete search history.

(56) References Cited

U.S. PATENT DOCUMENTS

| | | | | |
|---|---|---|---|---|
| 3,119,488 A | 1/1964 | Rainbow et al. | ............. | 198/206 |
| 3,510,014 A | 5/1970 | Speaker et al. | ............. | 198/365 |
| 3,780,297 A | 12/1973 | Geary | ............. | 198/365 |
| 3,910,404 A | 10/1975 | Henrekson | ............. | 198/835 |
| 3,977,513 A | 8/1976 | Ruthforth | ............. | 198/365 |
| 4,004,681 A | 1/1977 | Clewett et al. | ............. | 198/365 |
| 4,031,998 A | 6/1977 | Suzuki et al. | ............. | 198/365 |
| 4,139,088 A | 2/1979 | Olesen | ............. | 198/365 |
| 4,144,965 A | 3/1979 | Alldredge et al. | ............. | 198/838 |
| 4,151,447 A | 4/1979 | Con der Heide et al. | .... | 318/135 |
| 4,259,918 A | 4/1981 | Ward et al. | ............. | 198/502.4 |
| 4,278,165 A | 7/1981 | Nielsen et al. | ............. | 198/365 |
| 4,358,010 A | 11/1982 | Besch | ............. | 198/838 |
| 4,413,721 A | 11/1983 | Bollier | ............. | 198/802 |
| 4,422,544 A | 12/1983 | Alldredge | ............. | 198/838 |
| 4,438,842 A | 3/1984 | Alldredge et al. | ............. | 198/838 |
| 4,468,165 A | 8/1984 | Kawasaki | ............. | 414/403 |
| 4,624,617 A | 11/1986 | Belna | ............. | 414/347 |
| 4,635,785 A | 1/1987 | Prydtz | ............. | 198/365 |
| 4,744,454 A | 5/1988 | Polling | ............. | 198/365 |
| 4,792,036 A | 12/1988 | Heidelberg | ............. | 198/805 |
| 4,856,642 A | 8/1989 | Nickolson et al. | ............. | 198/365 |
| 4,927,006 A | 5/1990 | Dolan | ............. | 198/822 |
| 4,958,716 A | 9/1990 | Matsuo et al. | ............. | 198/346.1 |
| 5,054,601 A | 10/1991 | Sjogren et al. | ............. | 198/365 |
| 5,086,905 A | 2/1992 | Polling | ............. | 198/365 |
| 5,263,300 A | 11/1993 | Plent et al. | ............. | 53/244 |
| 5,385,243 A | 1/1995 | Jackson et al. | ............. | 209/509 |
| 5,588,520 A | 12/1996 | Affaticati et al. | ....... | 198/370.06 |
| 5,664,660 A * | 9/1997 | Prydtz | ............. | B65G 47/962 198/370.03 |
| 5,718,321 A | 2/1998 | Brugger et al. | ............. | 198/359 |
| 5,803,704 A | 9/1998 | Lazzarottie | ............. | 414/793.4 |
| 5,836,436 A * | 11/1998 | Fortenbery | ............. | B65G 11/023 198/370.03 |
| 5,959,868 A | 9/1999 | Oppliger et al. | ........ | 364/478.14 |
| 6,003,656 A * | 12/1999 | Fortenbery | ............. | B65G 47/962 198/370.03 |
| 6,009,992 A * | 1/2000 | Erceg | ............. | B65G 47/962 198/370.04 |
| 6,024,425 A | 2/2000 | Imai et al. | ............. | 312/35 |
| 6,026,967 A | 2/2000 | Isaacs et al. | ............. | 209/539 |
| 6,050,390 A | 4/2000 | Fortenbery et al. | ..... | 198/370.03 |
| 6,095,314 A | 8/2000 | Fortenbery | ............. | 198/360 |
| 6,112,879 A * | 9/2000 | Fortenbery | ............. | B65G 11/023 198/370.04 |
| 6,227,377 B1 | 5/2001 | Bonnet | ............. | 209/650 |
| 6,253,901 B1 | 7/2001 | Hintz et al. | ............. | 198/370.06 |
| 6,253,904 B1 | 7/2001 | Soldavini | ............. | 198/43.1 |
| 6,276,509 B1 | 8/2001 | Schuster et al. | ......... | 198/370.02 |
| 6,367,610 B1 | 4/2002 | Fortenbery et al. | ..... | 198/370.04 |
| 6,449,582 B1 | 12/2002 | Gillott | ............. | 198/360 |
| 6,501,041 B1 | 12/2002 | Burns et al. | ............. | 209/584 |
| 6,561,339 B1 | 5/2003 | Olson et al. | ............. | 198/349 |
| 6,607,066 B1 * | 8/2003 | Andersen | ............. | B65G 17/345 198/370.04 |
| 6,715,599 B1 | 4/2004 | Fortenbery et al. | ......... | 198/360 |
| 6,736,254 B1 * | 5/2004 | Fortenbery | ............. | B65G 47/962 198/370.03 |
| 7,156,220 B2 | 1/2007 | Olson et al. | ............. | 198/465.1 |
| 7,284,654 B2 * | 10/2007 | Affaticati | ............. | B65G 47/962 198/370.04 |
| 7,597,185 B1 | 10/2009 | Fortenbery et al. | ............. | 198/493 |
| 8,807,320 B2 * | 8/2014 | Fortenbery | ............. | B65G 47/962 198/370.03 |
| 8,851,267 B2 | 10/2014 | Sotelo et al. | ............. | 198/370.04 |

FOREIGN PATENT DOCUMENTS

| | | | |
|---|---|---|---|
| EP | 0495661 | 7/1992 | |
| EP | 0761322 | 3/1997 | |
| IT | 0590147 | 3/1959 | ................ 198/852 |
| RU | 0548495 | 3/1977 | ................ 198/838 |
| WO | WO 9934936 | 7/1999 | |

\* cited by examiner

CONVEYOR SYSTEM WHEEL FAILURE DETECTION AND REMEDIATION

This application is a 371 of International Application No. PCT/US15/47684, which claims the benefit of U.S. provisional application No. 62/043,781 filed Aug. 29, 2014.

BACKGROUND OF THE INVENTIONS (1) Field of the Inventions

The present inventions relate generally to package sorting conveyor systems, and more particularly, to a conveyor system having an improved conveyor system wheel failure detection module.

(2) Related Art

Conveyor systems having a number of individual carrying carts have been used for many years to carry and sort packages, such as packages including retail apparel. For example, U.S. Pat. No. 5,054,601 to Sjogren et al. discloses a package sorting conveyor comprised of a train of tilt tray carriers coupled in tandem to form a continuous loop. Each carrier includes a pivotally mounted tilt tray normally maintained in an upright position. The carriers are moved around the loop by a series of motors spaced around the loop. Branching out from the loop are outfeed chutes or the like for receiving packages from the carriers. When a particular carrier holding a particular package to be sorted reaches a selected outfeed chute, an actuator tilts the tray to dump the package into the outfeed chute. Another example of a typical package sorting conveyor is disclosed in International PCT Application Number PCT/DK90/00047 of Kosan Crisplant A/S, now U.S. Pat. No. 5,664,660.

Conventional sortation systems are being placed in increasingly high throughput situations, such as airport luggage sortation, where sortation is time sensitive and minimum conveyor downtime is desired. A heavy and constant sortation load increases wear on a conveyor system, however, scheduling immediate conveyor downtime for repairs is often not possible. This leaves the operator in the situation of choosing between cessation of sortation capabilities during potentially critical times or risking damage to the sortation system if repairs are needed.

For busy conveyor systems, it is often difficult to discern when specific repairs are needed. Therefore, the conveyor system may continue to operate with a deficiency for a duration before the need for repair is recognized. This presents a challenge in that the system may be operating below capacity and/or creating a potential for more damage to occur, which may result in higher repair costs and more downtime.

One way of addressing the above described situation, for example, in individual tilt-tray conveyors, has been to take the individual tilt-tray off-line while keeping the rest of the conveyor system active. This may work temporarily in some conveyor system scenarios, however, in some situations, even taking a damaged individual tray offline, may not prevent further damage that can be extremely costly and detrimental to sortation schedules.

Therefore, there remains a need for systems and methods for improved conveyor systems, particularly systems where repairs are needed for conveyors in high throughput scenarios.

SUMMARY OF THE INVENTIONS

The present inventions are directed to a sorting conveyor for transporting objects and unloading objects at one or more unloading stations adjacent the conveyor. The sorting conveyor includes a conveyor track and a train of conveyor carts. The conveyor carts may be connected end-to-end. At least one, including each, of the conveyor carts may include a frame base for engaging the conveyer track; a conveyor surface for holding the objects; a support for supporting the conveyor surface above the frame base, and a carrier including a plurality of wheels that interface with the track.

In one embodiment, at least one wear guard is associated with an axle support for preventing track wear in the event of a wheel failure. The wear guard may take on differing shapes, sizes and/or attachments to the conveyor. In one example, the wear guard may be a rotary device, such as a wheel, a skid plate, and/or a slide. The wear guard may include a shoulder and/or an arm. The wear guard may have a first side and a second side. The second side may be facing the track. The second side may be associated with the conveyor support to form a distance between the second side and the track. In some examples, the wear guard may be attached to the carrier, for example, to the axle guide.

In another embodiment, the sorting conveyor includes a drive motor and a driven member attached to the frame base for moving the conveyor carts around the track.

Another aspect of the present inventions is to provide a sorting conveyor for transporting objects and unloading objects at one or more unloading stations adjacent the conveyor where the sorting conveyor includes a conveyor track and a train of interconnected conveyor carts. At least one of the conveyor carts include a frame base for engaging the conveyer track; a conveying surface for holding the objects; a conveyor support for supporting the conveyor surface above the frame base; a carrier with a plurality of wheels; and at least one wear guard associated with an axel support for preventing track wear in the event of a wheel failure. The conveyor may also include a track wear prevention system including the wear guard and a height detection module. The wear guard inhibits track wear when the module detects a wheel failure. The height detection module may, for example, be adapted to recognize a change in axle positioning, a change in the positioning of the axle support and/or a change in the positioning of the wear guide. The height detection module may include a sensor. The sensor may be, by way of example, an infrared sensor. The height detection module may be in communication with a conveyor control system. The height detection module may send an alert to the conveyor control system when a height change is detected. The conveyor control system may register a warning to the operator that a wheel of the conveyor has been damaged. The wear guard allows continued usage of the conveyer system and prevents track wear during the time that a planned down-time to repair the damaged wheel can be scheduled.

These and other aspects of the present inventions will become apparent to those skilled in the art after a reading of the following description of the embodiments when considered with the drawings.

BRIEF DESCRIPTION OF THE DRAWINGS

Embodiments of the present inventions will be better understood by a reading of the Description of Embodiments along with a review of the drawings, in which.

DESCRIPTION OF THE PREFERRED EMBODIMENTS

Figure 1:
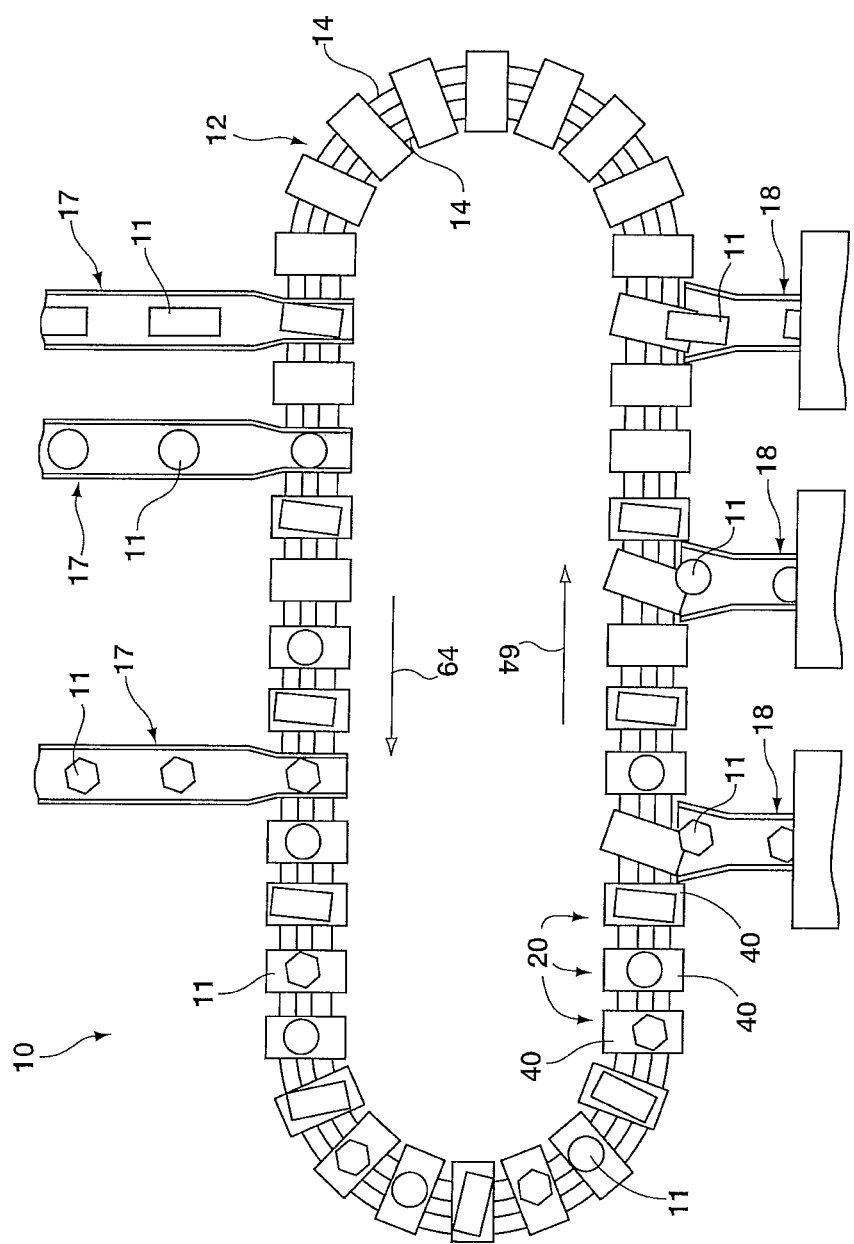
FIG. 1 is a top view of a conveying system constructed according to an embodiment of the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
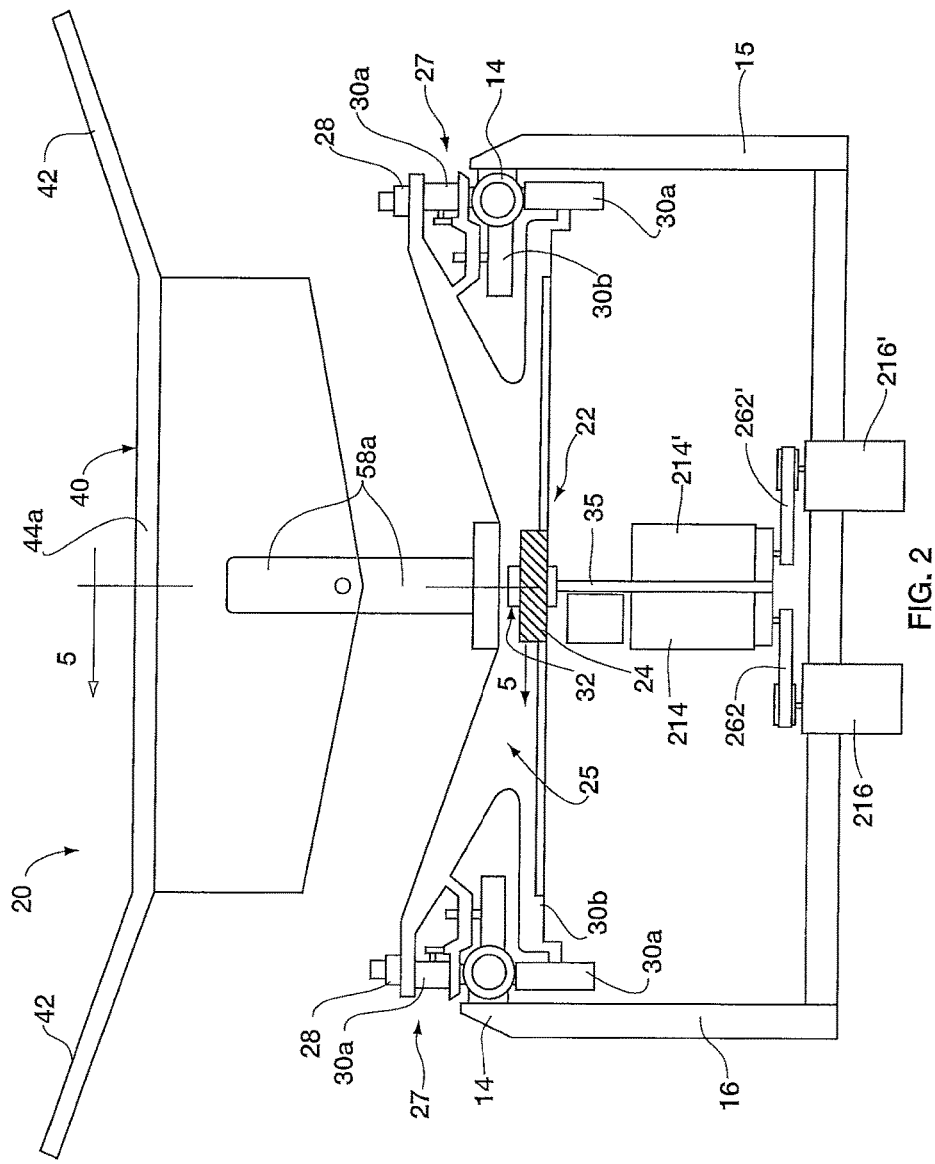
FIG. 2 is a front view of one example of a conveyor cart according to an embodiment of the present inventions.
Figure 3:
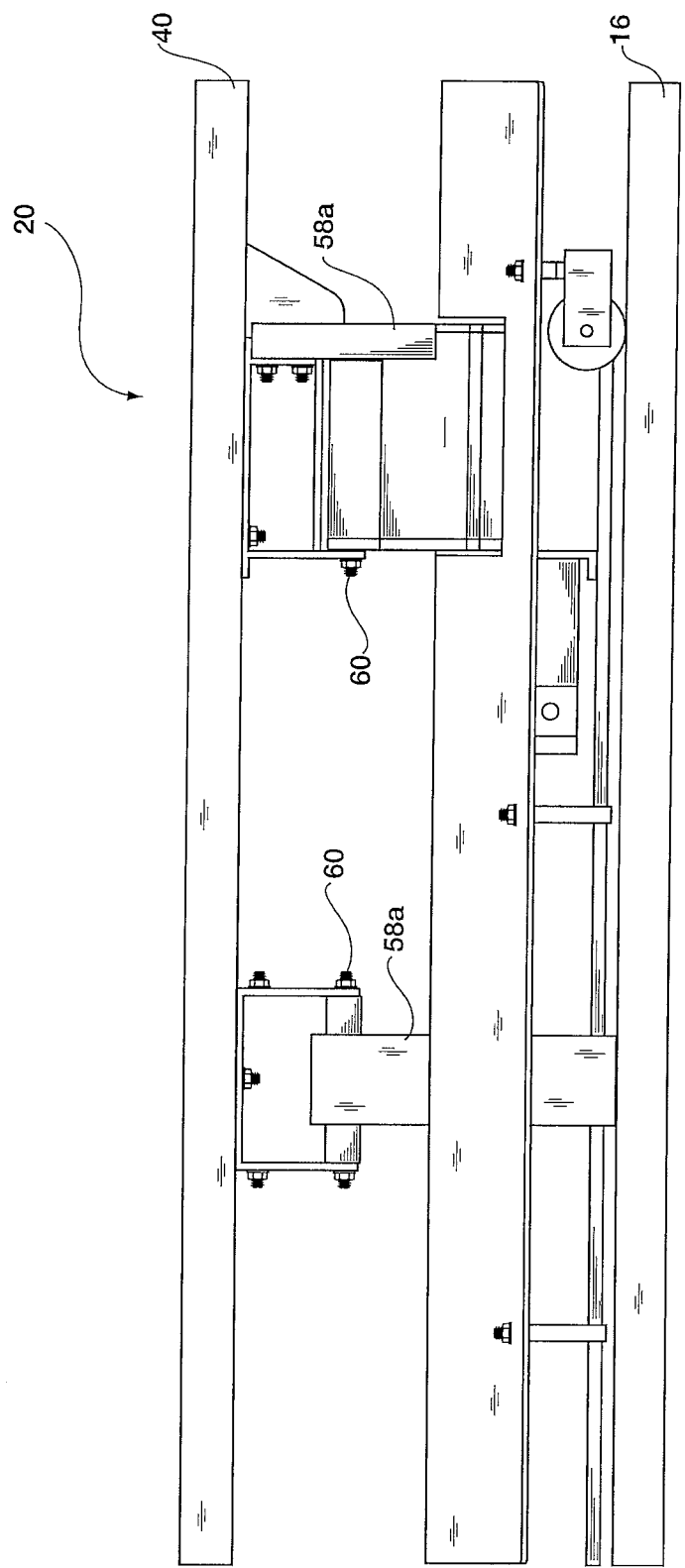
FIG. 3 is a side view of one example of a conveyor cart according to an embodiment of the present inventions.

Referring now to the drawings in general and FIGS. 1, 2 and 3 in particular, it will be understood that the illustrations are for the purpose of describing embodiments of the present inventions and are not intended to limit the disclosure or any inventions thereto. As best seen in FIG. 1, a sorting conveyor, generally designated 10, is shown embodied according to the present inventions for transporting and sorting packages or other objects. Typically, the sorting conveyor includes a train of individual carts 20, connected end to end, which may form an endless loop around a conveyor track 12 which may be a closed conveyor track. Alternately, the conveyor carts 20 of the present inventions could be used singly or as part of a finite train.

The sorting conveyor 10 generally includes a conveyor track 12 and the train of conveyor carts 20 that are generally moved around the track by one or more drive motors (not shown in FIG. 1). Each of the conveyor carts typically includes a frame base 22 for engaging the conveyer track; a conveyor surface 40 for holding the objects; a support 58a for supporting the conveyor surface 40 above the frame base and at least one wear guard 100 associated with an axle support 102 for preventing track wear in the event of a wheel failure. The conveyor surface may include, for example, a cross belt and/or a power tilt diverter as sold by Mantissa Corporation of Charlotte, N.C.

Shown in FIG. 3, in one example, the conveyor cart may include a tilting mechanism 50 for tilting conveyor carts 20 to discharge packages 11 therefrom. Typically, any number of unloading stations or outfeed chutes 18, which are adjacent the package sorting conveyor 10 on one or both sides thereof, receive the packages 11 discharged from the sorting conveyor 10 and carry the packages to waiting storage bins, trucks, etc. Packages may be manually placed on the conveyor carts 20 or may be delivered to the sorting conveyor 10 via infeed chutes 17 or the like.

The conveyor track 12 generally includes two parallel rails 14 and may be built to conform to the layout of any warehouse, shipping center, distribution center or the like. Best seen as resembling the track of a roller coaster, the conveyor track 12 may be substantially horizontal or may ascend and descend. The conveyor track rails 14 may lie in the same horizontal plane, or one may be higher than the other, such as would be the case in a banked curve in the track 12. Banked curves are greatly advantageous because they allow the conveyor carts 20 to move around a curved conveyor track 12 at a much greater speed without spilling packages 11 than on a flat track. Typically, the rails 14 are generally tubular, again similar to a roller coaster, and are supported by rail support members 16 only on the outwardly facing edges of the rails. The rails 14 may typically be round, however, may also be rectangular or take on other shapes in cross-section.

Figure 4:
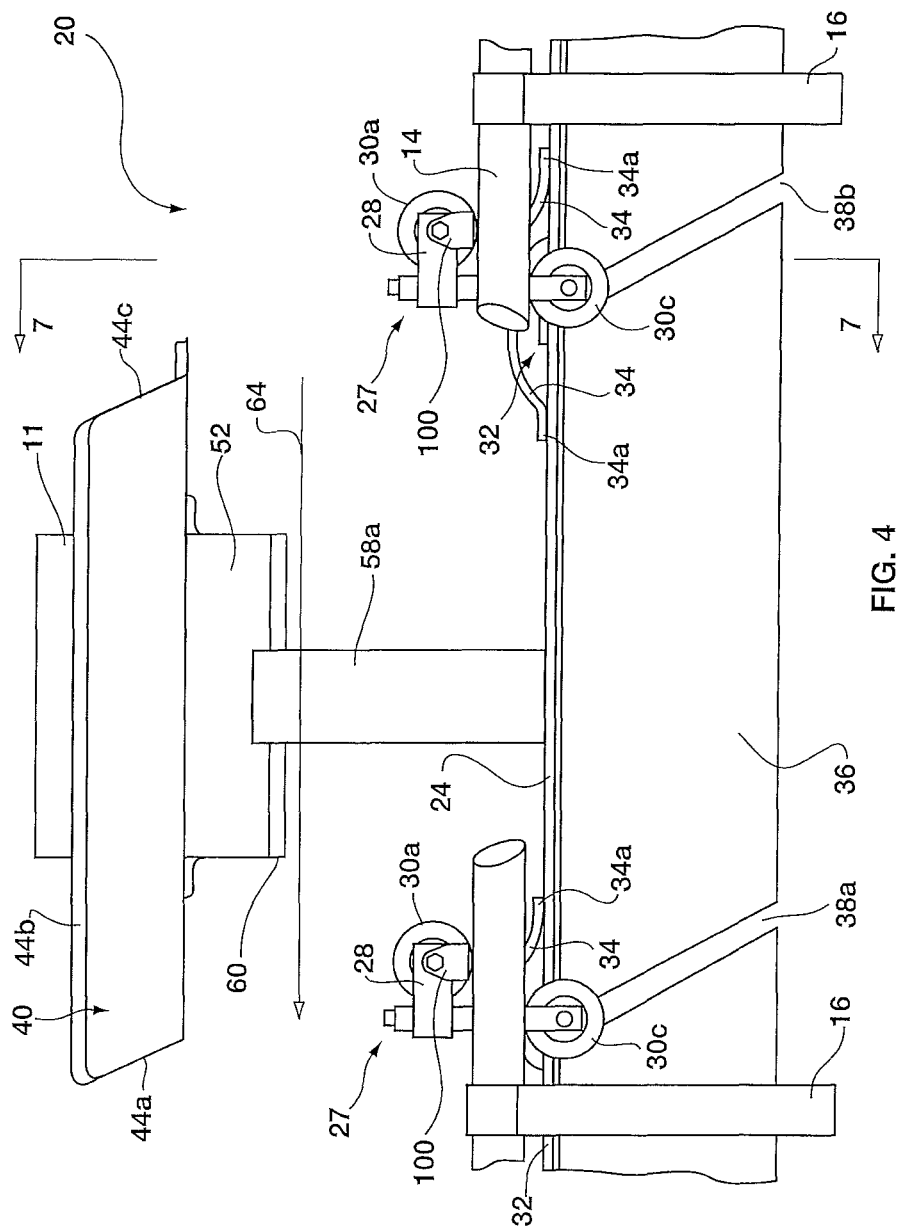
FIG. 4 is a side view of another example of a conveyor cart according to an embodiment of the present inventions.

Now turning to the train of conveyor carts 20, an example which is shown in FIG. 4, each cart 20 generally may include: a trailer frame base 22, a generally horizontally disposed carrying tray 40 for holding the packages 11, and a support 58a for supporting the carrying tray 40 above the trailer frame structure 22 and for allowing tilting of the carrying tray 40 towards either side of the sorting conveyor 10 to unload a package into one of the unloading stations. Each cart 20 is built around the trailer frame base 22 to which other components of each cart 20 are mounted. The trailer frame structure 22 includes a longitudinal base member 24 that extends in the rearward direction of conveyor travel 64 between the two parallel rails 14. Preferably, the base member 24 is substantially equidistant from each rail 14.

A roller structure 26 (seen in FIG. 5) for riding on the conveyor track 12 is mounted on a front end of the base member 24 and includes two laterally extending cam follower mechanisms 27, one for each rail 14. The reason for the outboard placement of the rail supports 16 and the tubular shape of the rails 14 becomes apparent upon examining the cam follower mechanisms 27. Each cam follower mechanism 27 may include three cam followers: an upper cam follower 30a for riding on the top edge of the rail 14, a middle cam follower 30b for riding on an inside edge of the rail 14, and a lower cam follower 30c for riding on the bottom edge of the rail 14. With this configuration, it is almost impossible for a cart 20 to jump the track 12, because a wheel is provided for each directional force (sideways, upward and downward) that a cart 20 may encounter when traveling along the track 12. Preferably, each cam follower 30a, 30b and 30c is constructed of a somewhat resilient material such as polyurethane to provide for smooth, quiet, relatively vibration-free operation of the sorter conveyor 10.

The structure of one embodiment of each cam follower mechanism 27 that holds the top wheel 30a is shown in greater detail in U.S. Pat. No. 5,836,436, which is herein incorporated by reference in its entirety. Each top cam follower 30a is retained by an axle caster 28 that is preferably formed from extruded aluminum or the like. The axle caster 28 includes two forks, one on each side of the wheel 30a, and a bearing bore disposed at the juncture of the two forks which has an opening on one side so that the bearing bore communicates with the space between the forks. A pair of flange bearings seated in the bearing bore are disposed around an axle shaft extending from the roller structure 26. Preferably formed of an Oilite® metal alloy or other friction-reducing material, each flange bearing has the form of a top-hat bushing and includes a center hole through which passes the axle shaft. The cam follower 30a is held in place between the two forks by a bolt and nut. Preferably, the cam follower 30a includes a bearing structure disposed around the bolt, which serves as an axle running through the center of the wheel 30a.

The axle caster 28 of the present inventions provides that the flange bearings can easily be slid into place by hand into the bearing bore 28 without using a press. Then, to immovably secure the flange bearings inside the bearing bore, the forks are slightly flexed inwardly towards each other as the nut is tightened onto the bolt to hold the wheel 30a in place. The forks of the axle caster are therefore formed minutely wider apart than would be necessary to merely hold the wheel 30a. When the forks are flexed inwardly towards each other by tightening the nut on the bolt, the opening of the bearing bore is closed somewhat and the bearing bore is itself slightly distorted, securely retaining the flange bearings therein. The flange bearings themselves are, however, not significantly distorted and are free to swivel back and forth on the axle shaft. Therefore, the flange bearings can easily and immediately be replaced on-site when worn, eliminating much down-time that would be required if conventionally designed axle casters were used in the conveyor cart 20 of the present inventions.

Adjacent carts 20 in the train are connected together using hitch mechanisms 32. Each hitch mechanism 32 as including a front hitch mounted on the front end of the base member 24 in front of the roller structure 26 and a rear hitch mounted on the rear end of the base member. In one embodiment, each hitch 32 has a vertical throughbore, through which a hitch pin connector is inserted. The hitch mechanisms 32 may be configured so that the front hitch on a rearward cart is disposed overtop of the rear hitch on a forward cart. In the alternative, the hitch mechanisms 32 may comprise a polydirectional spherical ball joint mechanism similar in structure to an automotive trailer hitch. In either case, friction between hitch mechanism components is preferably reduced by, for example, lining the hitch components with TEFLON® polymer or other relatively low-friction material.

To prevent adjacent conveyor carts 20 from separating should the hitch mechanism 32 accidentally break or become uncoupled, an auxiliary cart connector 34 is preferably connected between the trailer frame structures 22 of adjacent carts 20. The auxiliary cart connector 34 may be a metal cable or lanyard, although other high-tensile strength materials could be used. In the embodiment depicted, the auxiliary cart connector 34 is an approximately 3/16th inch thick metal cable connected to adjacent trailer frame structures 22 with metal mounting connectors 34a.

The primary reason that metal is the preferred material for the auxiliary cart connector 34, besides its strength, is so that the auxiliary cart connector 34 will also serve as a continuous electrical connector between adjacent carts 20. Electrical continuity between carts 20 may be important in some examples because of static electricity build-up while the carts 20 are traveling around the conveyor track 12. However, because the cam followers 30a, 30b and 30c are preferably formed of polyurethane (an electrical insulator) and because the components of the hitch mechanism 32 are preferably coated with TEFLON® polymer (also an electrical insulator), electrical continuity between adjacent carts 20 may not otherwise be effectively achieved. By electrically connecting the carts 20, static charges can be bled off from the train, for safety and operational considerations. Thus, the auxiliary cart connector 34 serves two purposes: first, it physically attaches two adjacent conveyor carts 20 and prevents them from becoming completely separated should the hitch mechanism 32 fail; second, it enables electrical continuity among all of the conveyor carts 20 in the train.

Even without the auxiliary connector cable 34, only the rear end of the trailer frame structure 22 will drop below the conveyor track 12 upon accidental disengagement of the hitches or upon breakage of the hitch mechanism 32. Therefore, instead of the front end 36a of the driven fin 36 digging into the floor sides or underlying structures below the conveyor, as is the case with prior art conveyors, the driven fin 36 will simply be dragged with relatively minimal damage should one of the hitches 32 break or become accidentally uncoupled. If an auxiliary connector cable 34 is attached between two adjacent carts 20 that break apart, the connector cable 34 will limit the distance that the rear end of the trailer frame structure 22 will drop, further limiting damage.

Mounted atop the trailer frame base 22 of each conveyor cart 20 is the support 58a, which supports the conveying surface 40. In one example, the conveying surface 40 may be a carrying tray and in another example, the conveying surface may be a conveying belt. There may be one or more supports 58a.

Figure 5:
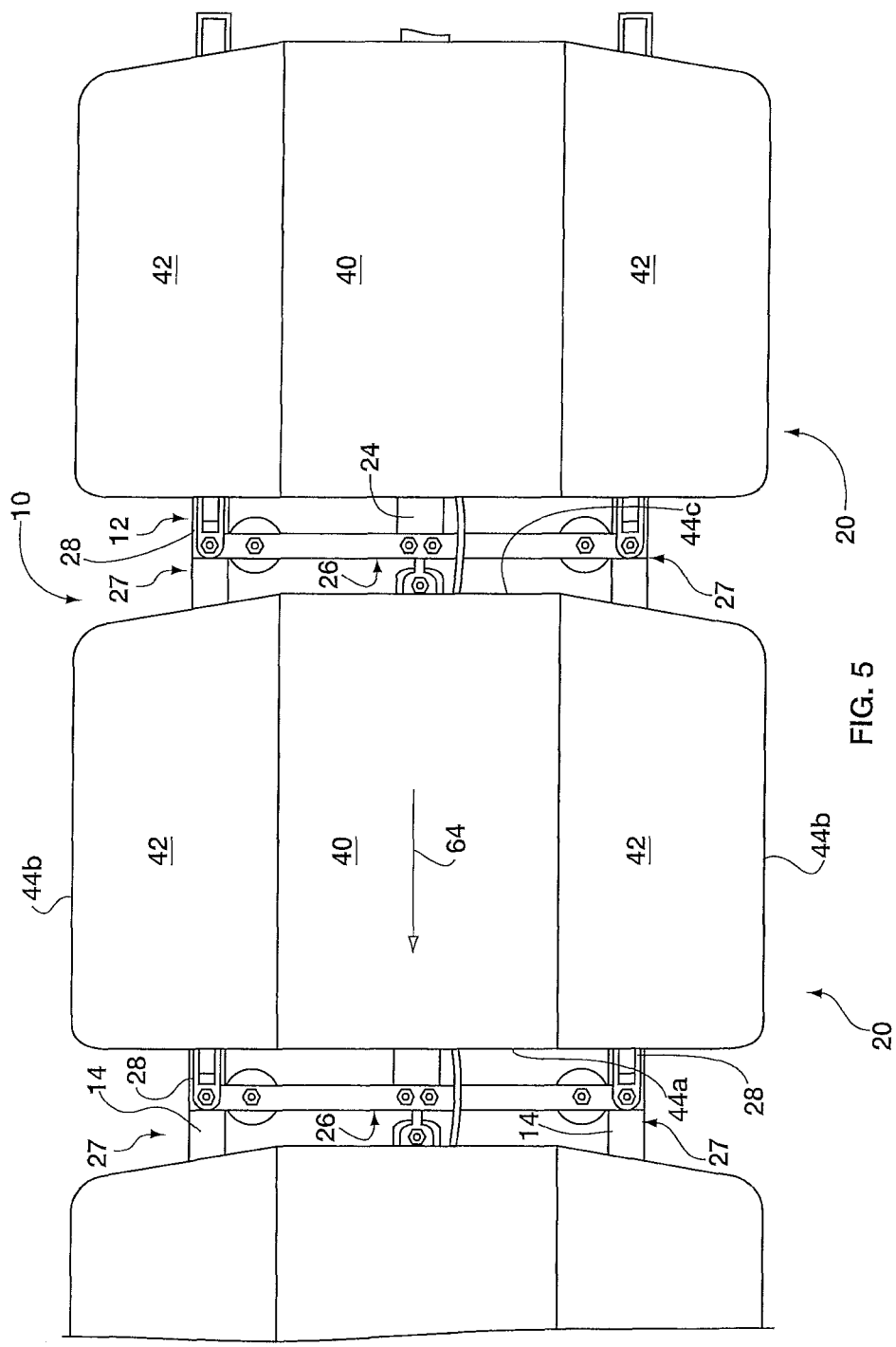
FIG. 5 is a top view of one example of a conveying surface of a sorting conveyor according to an embodiment of the present inventions.

In one embodiment, as best seen in FIGS. 3, 4 and 5, the support structure 58a may be a generally planar member that lies in the vertical plane parallel to the conveyor line of travel 64. In one example, the support may include a pivot structure 60 and/or could take on the form of a hinge structure joining together two generally planar support structures, one 52 attached to the tray 40, and one 58a extending from the frame base 22.

As can be seen in the drawings, the conveying surface 40 may be planar or may also include upwardly angled lateral wings 42 to help prevent packages 11 from accidentally falling off the conveying surface 40. These wings 42 also decrease the angle of the slope created when the conveying surface 40 is tilted, which helps with gentle handling of the packages 11 as they are discharged from the cart 20.

When a conveying surface 40 reaches a particular destination unloading station 18, in one example, the tilting mechanism 50 tilts the conveying surface 40 to cause a package 11 carried thereon to be discharged into the unloading station 18. In this example, a tilting mechanism 50 is generally mounted on each conveyor cart 20.

In one embodiment, as seen in FIGS. 9A through 9H, the tilting mechanism 50 includes at least one gear 106a having at least one cam 110a for tilting the conveying surface 40 toward at least one side of the conveyor. The tilting mechanism 50 is typically mountably attached to a portion of the cart 20, usually the support 58a, and engages with a camway. The camway may be at least partially housed within a support 58a. The cam may be rotatable around an axis of rotation between about 0 and about 360 degrees. The cam may travel to varying degrees around the axis of rotation, for example, between about 0 and 140 degrees, 0 and 120 degrees, 0 and 90 degrees and/or a combination or other degrees in between.

In another embodiment, the tilting mechanism 50 may further include an extension or camway or second camway, a second gear 106b having a second cam 110b, wherein the second cam is rotatable around an axis of rotation between about 0 and about 360 degrees. The cam may travel to varying degrees around the axis of rotation, for example, between about 0 and 140 degrees, 0 and 120 degrees, 0 and 90 degrees and/or a combination or other degrees in between.

In FIG. 3, a tiltable support 58a is shown in a substantially non-tilted position on the axis of tilt. In this position, the support 58a is supporting the conveying surface 40 in a substantially neutral position. The support 58a, moving back to FIGS. 9A-9H, may include one or more camways extending substantially horizontally and/or substantially vertically throughout the mechanism 50. The cams move within and/or without the camways, respectively, as the gears are rotated around their axis of rotations when movement is activated by a gear drive. As the cams move within the camways, the tiltable support, and thus the conveying surface 40, is tilted around the axis of tilt.

The conveyor cart 20 may also include a tilt sensor for determining the direction of tilt of the conveying surface 40. The tilt sensor includes switch. The tilt sensor may be a dual tilt sensor and include switches. The tilt sensor may also include an array of switches. The tilt sensor may be adapted to operate as a direction indicator. The tilt sensor may also or otherwise be adapted to operate as a positioning indicator. The tilt sensor may be configured to sense a reference area on a corresponding gear.

The switches may be, by way of example, non-contact sensors that operate in a closed, and alternatively, an open position. As will be recognized by one of skill in the art, a variety of sensors may operate to provide similar feedback about reference areas on one or more gear, however, in this example are switches that close upon the presence of a metal reference point and remain open when in the presence of a non-metal reference point.

Generally, in operation, the switches provide feedback that may be processed to determine and control the direction of tray tilt and/or the positioning of the tray. In FIG. 3 it can be seen that when the conveying surface 40 (as a result of the support 58a) is in a neutral position, and the cams are therefore at about 0 degrees about the axis of rotation. At the 0 degrees position, both cams are located inside a substantially vertical portion of the camways. With both cams in this position, the tray is locked in a neutral, mostly horizontal, position. This locked structural positioning serves to keep the tray locked in a neutral position even in the event of power loss or mechanical malfunction and prevents errant and unintended deposition of packages 11.

When it is desirable for the tray to be tilted, the gear drive, powered by a drive device, may be actuated in a clockwise or counterclockwise direction. If the drive gear actuates in a clockwise direction, then the gears will turn about their axis of rotation in a counter clockwise direction and cause the conveying surface 40 to tilt in the clockwise direction, or same direction as the rotation of the drive gear and vice versa.

The drive gear may also actuate in a counterclockwise direction and causing the gears to turn about their axis of rotation in an opposite, clockwise direction. As the gears begin to rotate, the associated cams also rotate and move along their respective camways. Movement of the cams in the camways allows the support to tilt along the pivot axis. Rotation clockwise of the gears causes upward movement of the cam in camway and downward movement of the other cam in its respective camway. At approximately 45 degrees of rotation, the first cam has reached the peak of its camway while the second cam has begun to exit its internal camway located within the support 58a. This configuration allows for significant movement of the cams within the camways prior to instigating tilting of the support 58a and the conveying surface 40. When the trays begin to tilt, the tilting mechanism 50 may come under significant load attempting to deposit packages 11. Applicant has found that allowing the drive gear to ramp up movement prior to experiencing the load during tilt, may significantly increase efficiency and accuracy of the tray tilt. Applicant also recognizes that ramping down movement, for example the drive gear, prior to returning the tray to the neutral position, may contribute to increased efficiency and accuracy of the tray tilt as well.

Figure 9A:
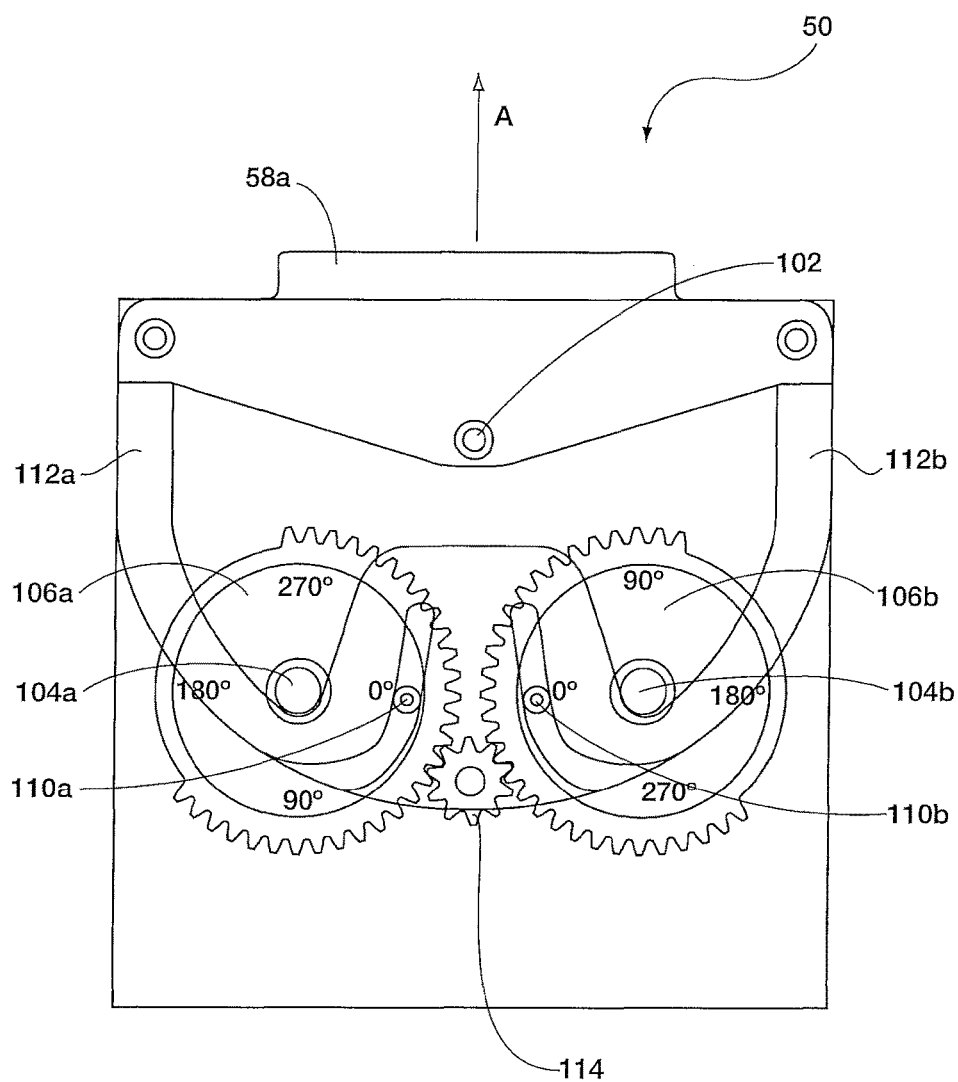
FIGS. 9A-9H show one embodiment of a tilting mechanism in different positions and a tilt sensor when the conveyor surface is in different positions.
Figure 9B:
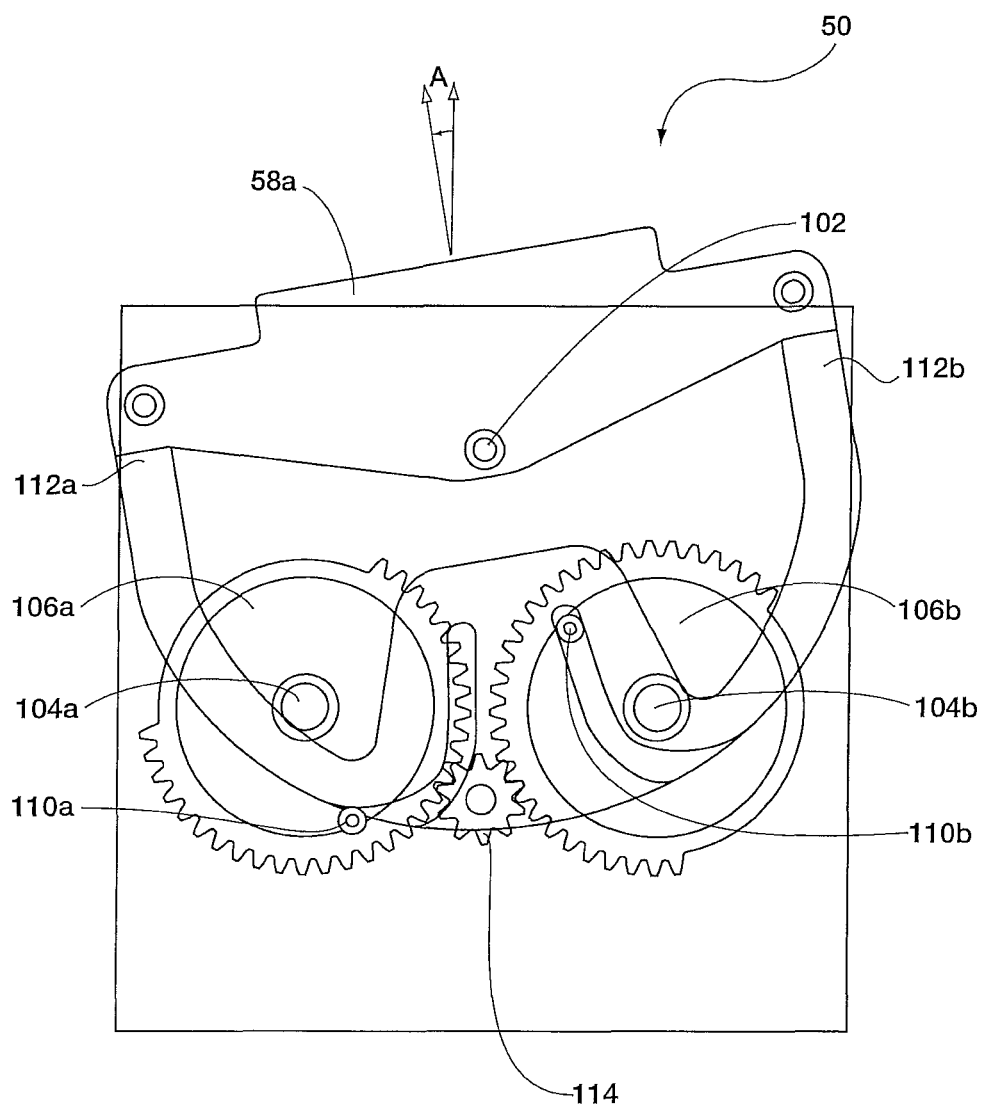
Figure 9C:
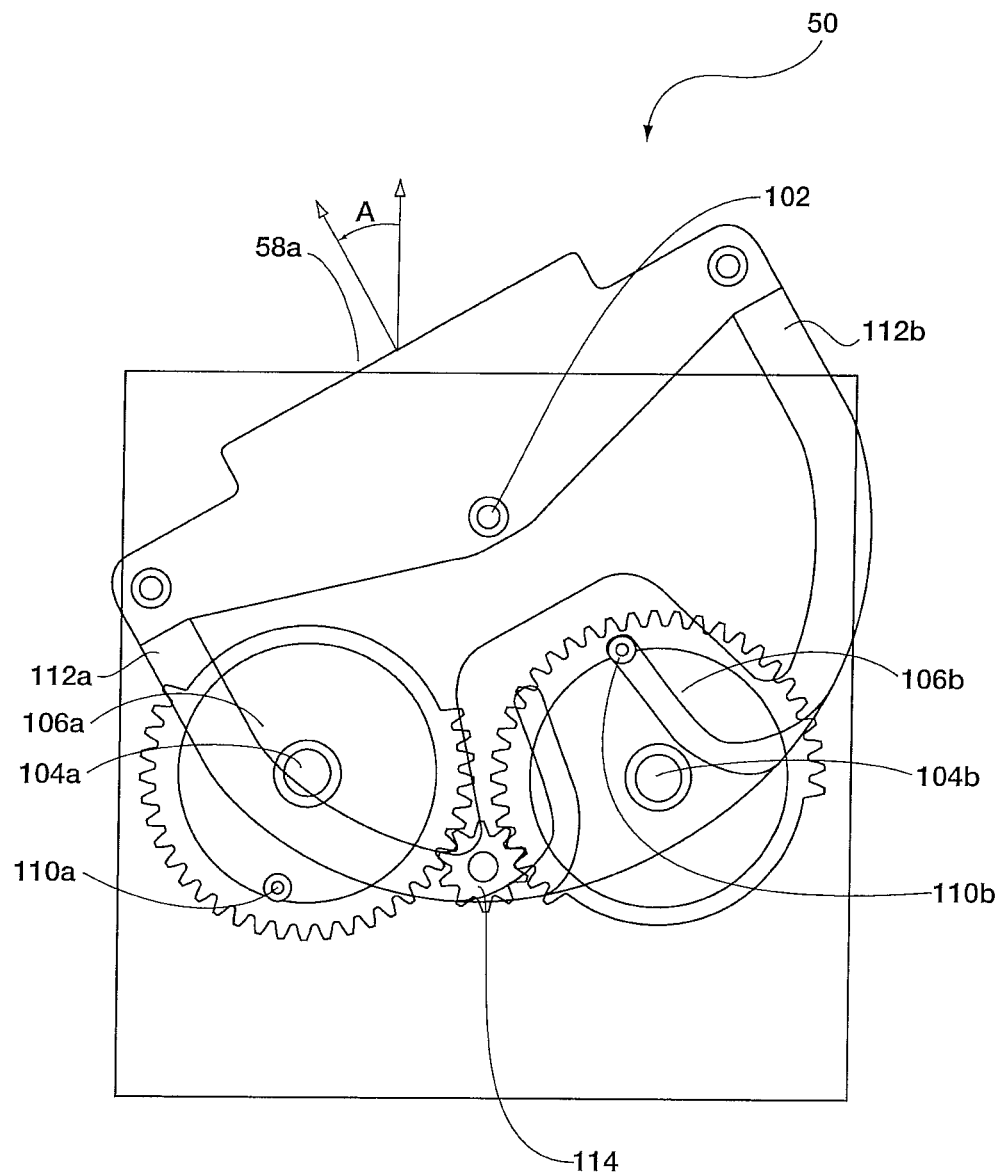
Figure 9D:
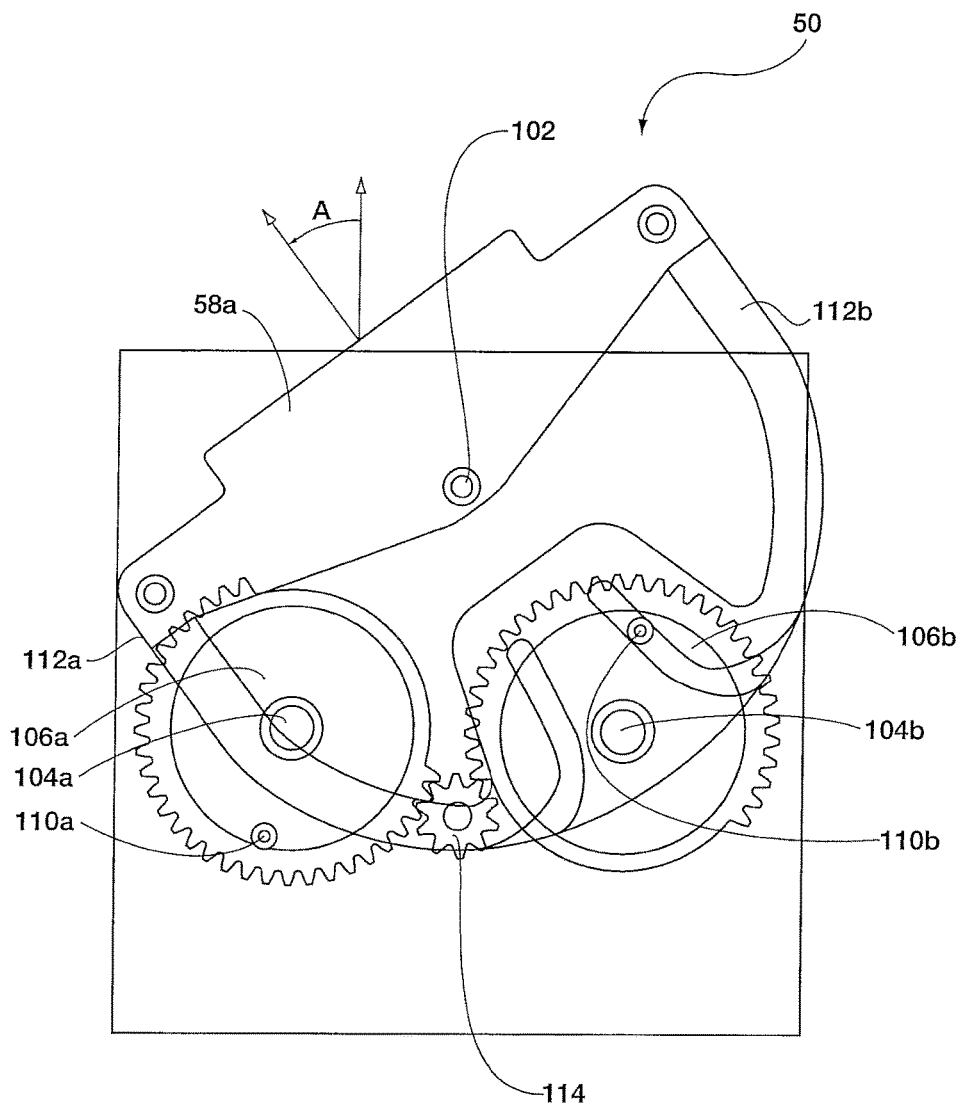
Figure 9E:
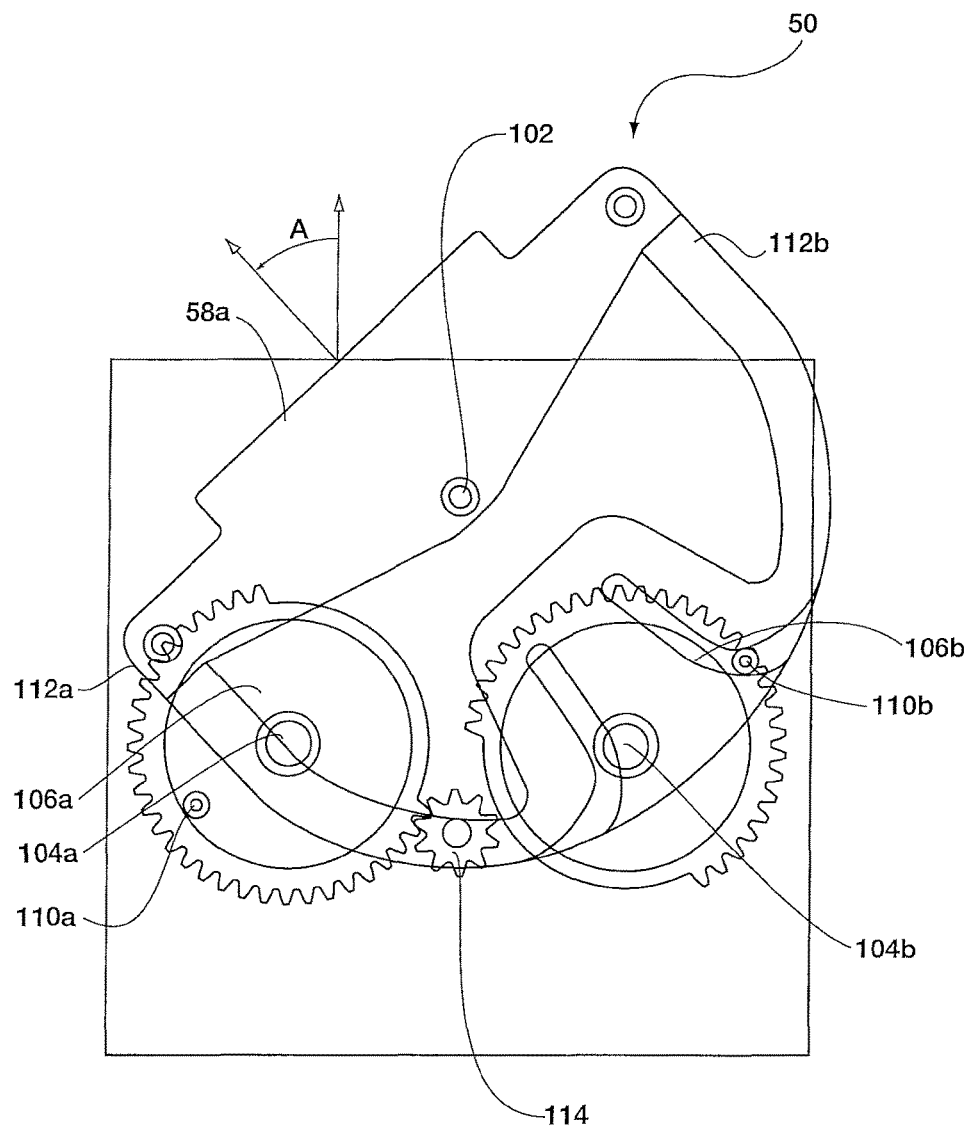
Figure 9F:
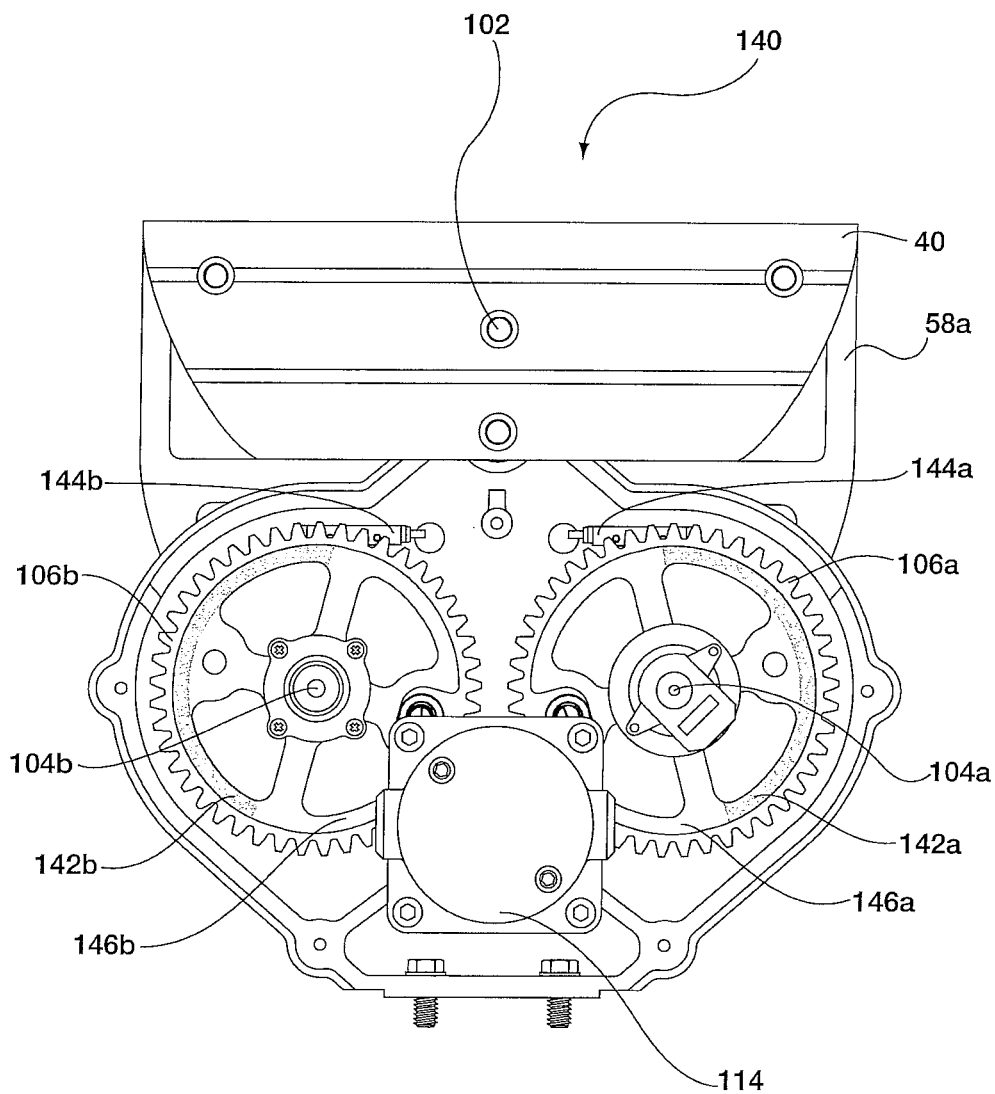
Figure 9G:
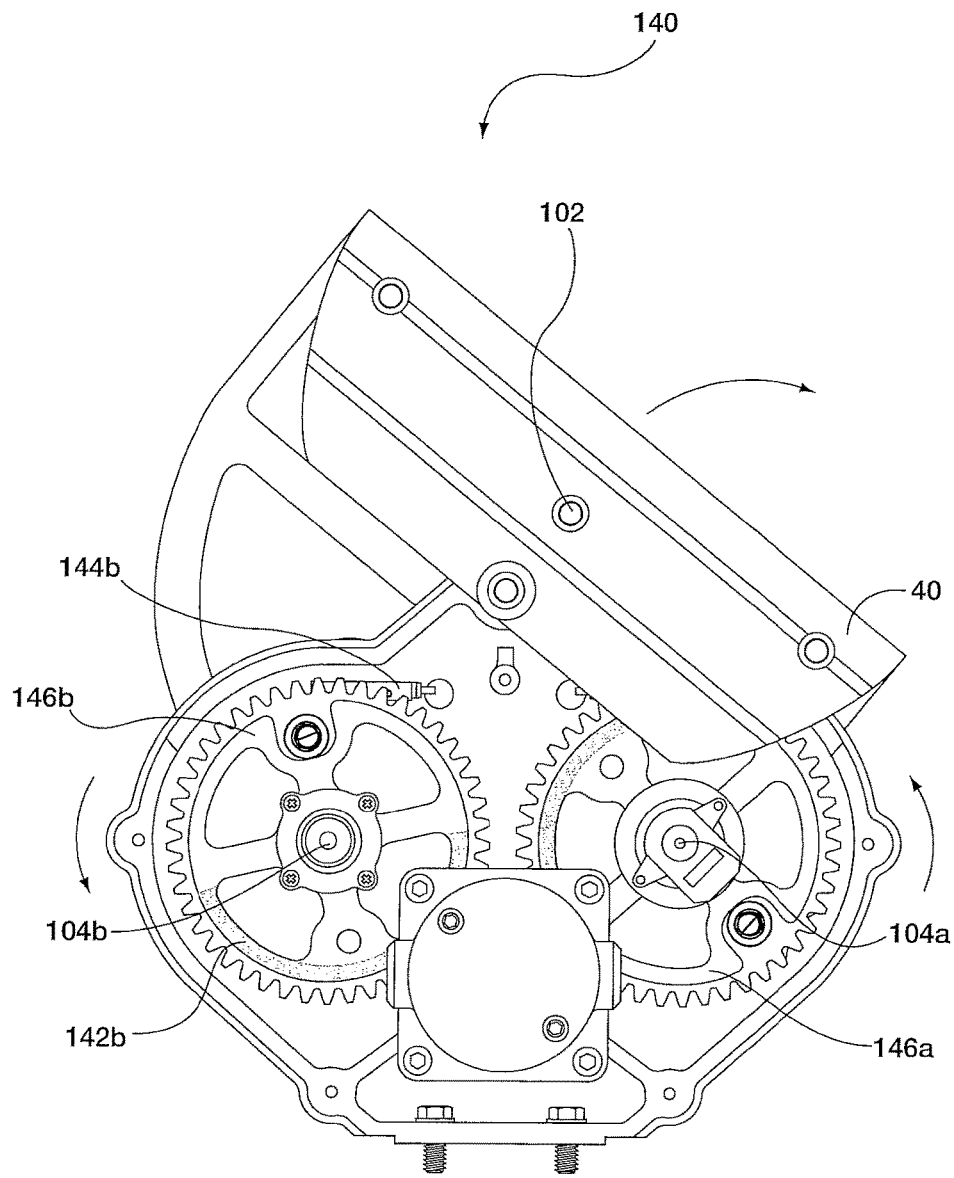
Figure 9H:
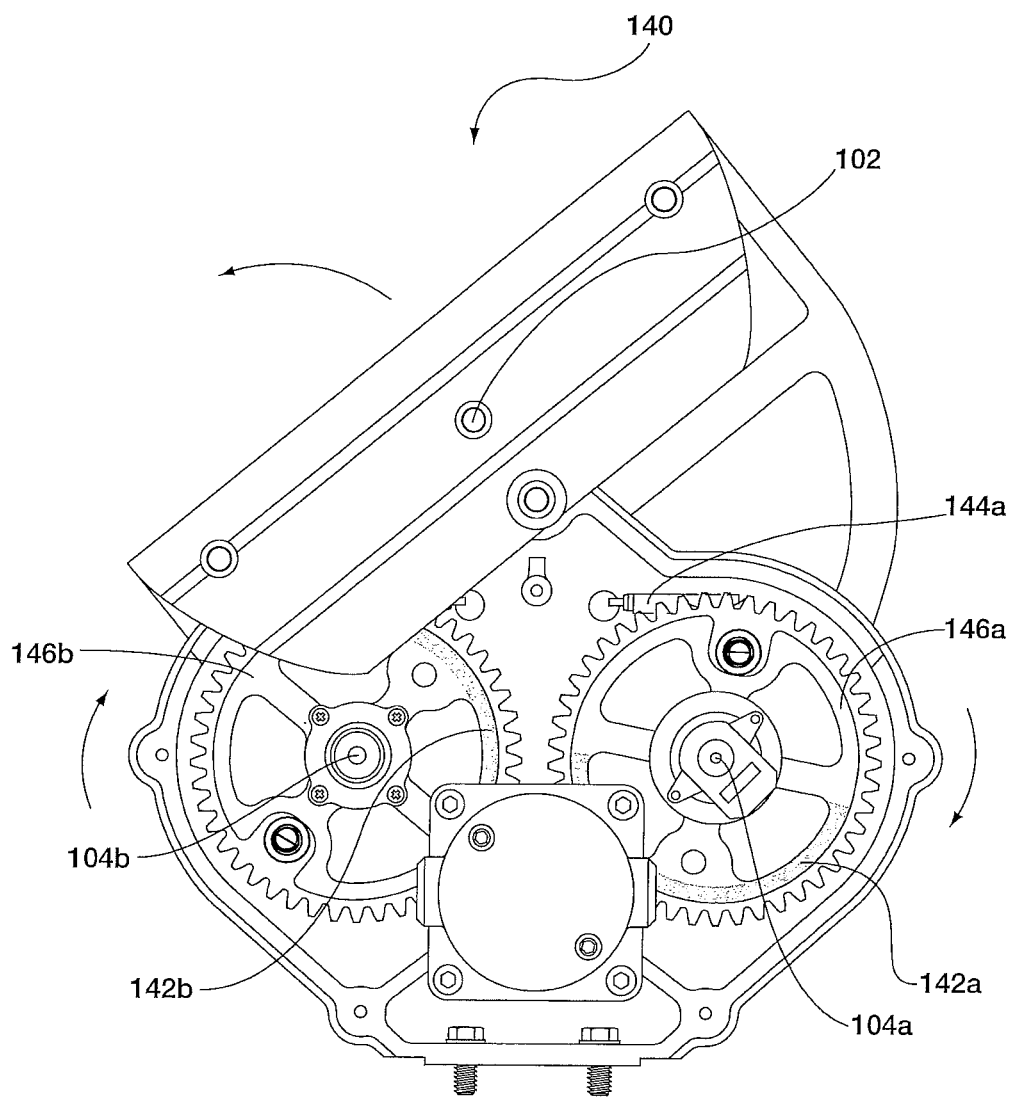

FIGS. 9A, 9B and 9C show continued clockwise movement of the gears by approximately 90 degrees so that first cam 110a has traveled downward in its camway 112a and proceeded substantially horizontally to exit the internal camway. Second cam 110b originally proceeding upward in its camway, is now directed to move back down the caraway and out into an extreme position at approximately 135 degrees of gear rotation allowing for left (or counterclockwise) tilt of the conveying surface 40 to about 45 degrees from its neutral position, adequate for depositing a package 11 carried on the conveying surface 40. This movement allows the drive gear 114 to ramp down as the tray reaches maximum tilt and the gears 106a and 106b approach maximum rotation sufficient to accomplish desired tray tilt. The gears 106a and 106b operate in a reverse fashion about the axis of rotation 104a and 104b to return the cams to the idle state where the conveying surface 40 is locked in a neutral position.

Figure 8:
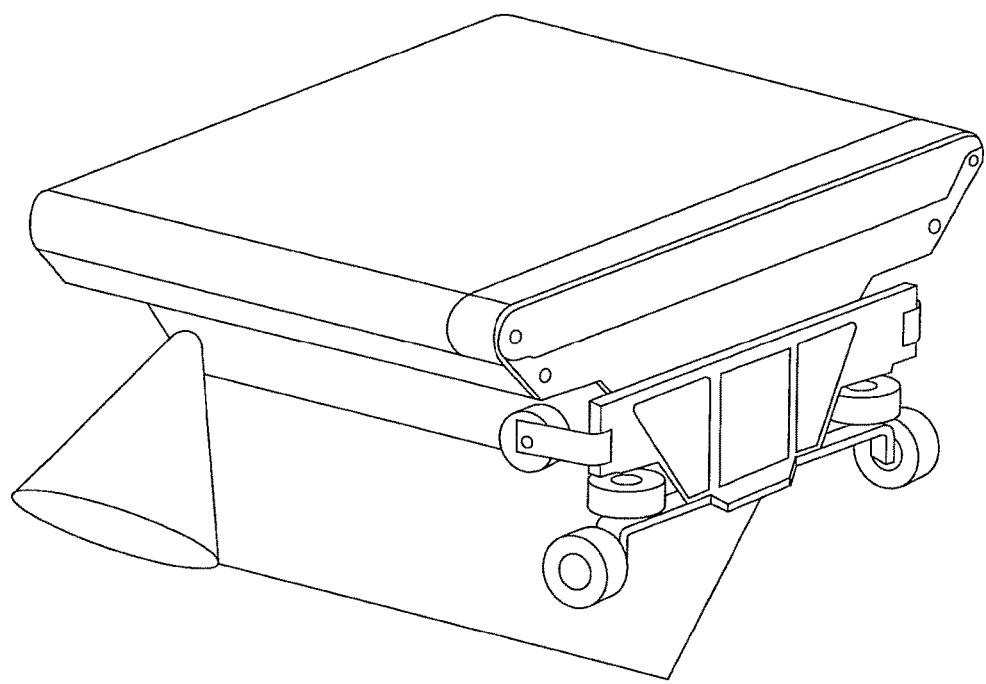
FIG. 8 is a perspective view of a height detection module sensor on a sortation conveyor according to an embodiment of the present inventions.

In other examples, the conveying surface 40 includes a cross belt (see FIG. 8). The cross belt may be independent electrically controlled as a diverter mechanism to discharge a package 11 from the sorter. The cross belt's divert algorithms may be independent of the sortation speed, thus allowing greater flexibility for sortation requirements.

Additionally, the invention may further include a drive motor for moving the conveyor carts around the track.

Figure 10:
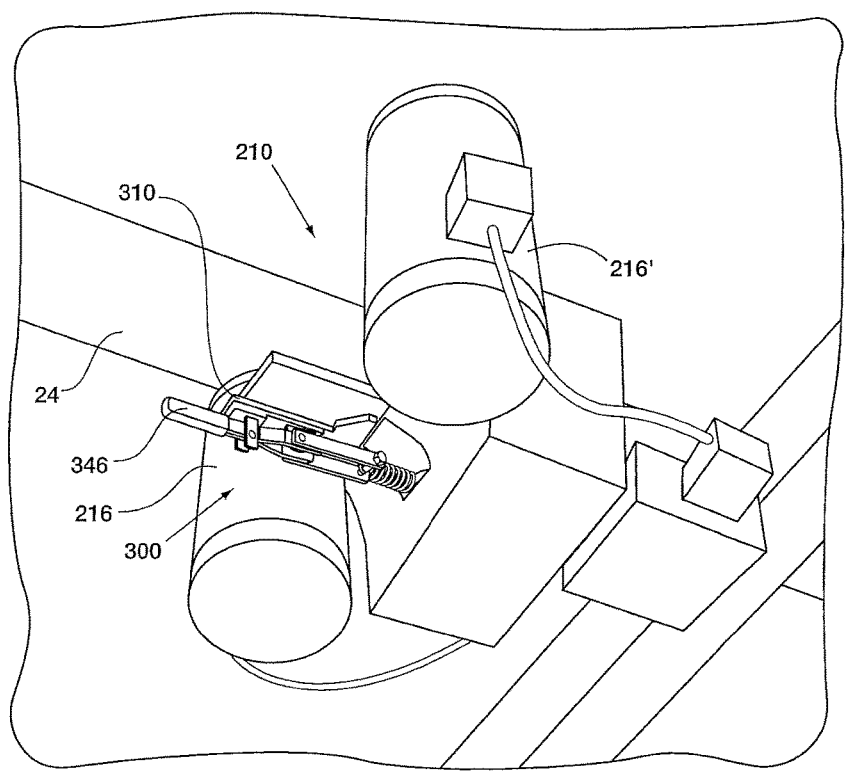
FIG. 10 is a bottom perspective view of the opposed motor roller assembly, with the track elements omitted for clarity.

In one example, the drive motors may include an opposed roller motor assembly 210, which move the conveyor carts along the conveyor track 12 by the opposed roller motor assembly. The opposed roller motor assembly 210 of the sorter conveyor 10, which is shown in FIG. 10, may be a pair of opposed drive roller assemblies 214, 214', which is discussed in more detail in FIGS. 11 and 12. A driven fin 36, which is attached to the bottom of each conveyor cart 20, hangs between the two drive roller assemblies 214, 214'.

Composed of semi-rigid, high coefficient aluminum or other conductive metal, the vertical fin 36 preferably has swept-back front 36a and rear 36b edges, as shown in FIG. 4, giving the fin 36 a generally parallelogram shape to reduce damage in the event the fin would contact a structure and to distribute the air gap over the length of the drive rollers to reduce noise and maintain more constant thrust. Specifically, because the gap is angled with respect to the roller, the roller does not hit the gap like a pot hole that is large enough for both wheels to hit at the same time.

Vertically orienting the fin 36 and the opposed roller assembly 210 also reduces problems with maintaining proper spacing between the fin 36 and the drive rollers, because gravity ceases to be a factor as the weight of the live load varies. This results in the fin 36 being easily maintained equidistant between the two drive rollers.

The opposed roller motor assembly 210 ordinarily moves the train of conveyor carts 20 in one direction of travel; however, it can also be reversed if necessary to slow or stop the conveyor.

In one exemplary embodiment, the opposed motor roller assembly 210 of the present inventions is comprised of a pair of support frames 212, 212', a pair of opposed drive roller assemblies 214, 214', and a pair of motor assemblies 216, 216'. The second drive roller assembly 214' provides the opposing surface that exerts pressure in conjunction with the first drive roller 214 on the driven fin 36 of the cart 20.

Figure 11:
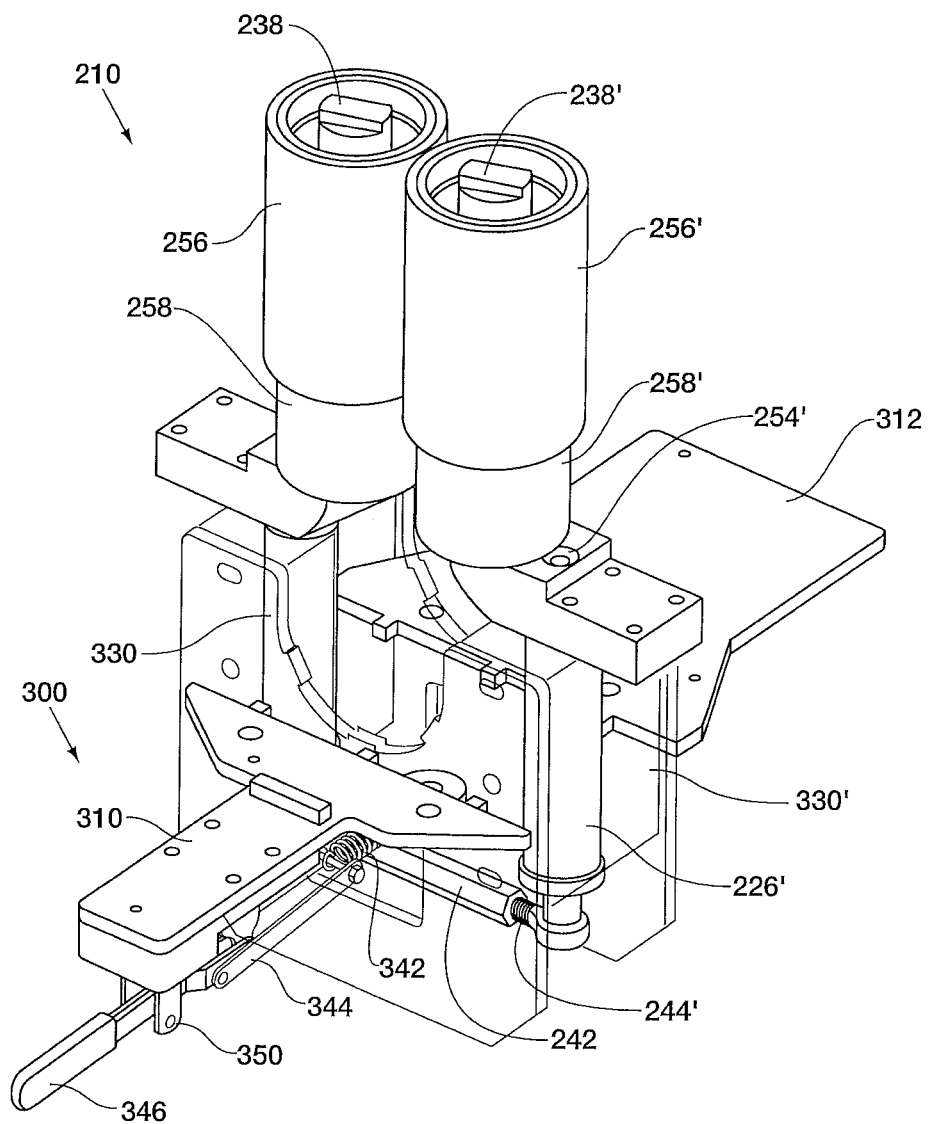
FIG. 11 is a perspective view of an isolated opposed motor roller assembly, with the elements shown in phantom and omitted for clarity.

As shown in FIGS. 10 and 11, opposed motor roller assembly 210 and self-tensioning adjustment assembly 300 generally tie movement of the rollers together. For instance, as one roller moves closer, or away, from the driven fin, the opposing roller mirrors the first rollers movement. Thereby, the drive rollers contact the driven fin simultaneously from each side to be self-centering.

Typically, the opposed roller motor assembly 210 may include a cantilevered, drive roller 214 that is connected to first pivot block assembly 330 and second pivot block assembly 330' to position drive roller 214. The pair of motor assemblies 216, 216' may be mounted on respective pivot block assemblies 330, 330' and are connected to the shafts of motor assemblies 216, 216', for instance with drive belts 262, 262'. Further, self-tensioning adjustment assembly 300 is generally affixed to base 222 and includes self-tension clamp plate weldment 310 to position the pivot block assemblies about a centered position relative to self-tensioning adjustment assembly 300.

Self-tensioning adjustment assembly 300 generally maintains opposed motor assembly 210 in perpendicular contact with the driven fin. For instance, self-tensioning adjustment assembly 300 minimizes, or prevents, twisting as the driven fin moves from one drive roller 214 to another. Additionally, self-tensioning adjustment assembly 300 maintains drive roller 214 in a neutral position with respect to driven fin 36 and guide wheels 30. In this manner, the guide wheels will not comprise the reactive pressure of drive roller 214.

As shown in FIG. 10, lever arm 346 is connected to self-tension clamp plate weldment 310 which allow adjustment of the two pivot block assemblies. As illustrated, lever arm 346 may adjust both first pivot block assembly 330 and second pivot block assembly 330'. In other examples, the first pivot block assembly 330 and second pivot block assembly 330' may be coupled together with the self-tensioning adjustment assembly 300, for instance so that movement of each pivot block assembly mirrors movement of the opposing pivot block assembly about a centered position.

FIG. 11 shows one embodiment of an isolated opposed motor roller assembly 210 that is connected to first pivot block assembly 330 and second pivot block assembly 330'. First pivot block assembly 330 and second pivot block assembly 330' position drive roller 210 adjacent to one surface of the extended driven fin. A pair of support frames 212 and base 222 are attached to the conveyor track 12 (see e.g. FIG. 1 or FIG. 3 for track 12) and self-tensioning assembly 300. Self-tensioning assembly 300 may be connected to base 222 through a weldment, for instance drive clamp plate 310. Similarly, a second weldment, for instance a drive clamp plate 312 as introduced in FIG. 13, may secure the first pivot block assembly 330 and/or second pivot block assembly 330'.

Pivot block assemblies 330, 330' may be further connected forward of the first shafts 226, 226' with a compression linkage 242. In this particular embodiment, the first end 244 of compression linkage 242 is connected to pivot block assembly 330, while the second end 244' of compression linkage 242 is connected to pivot block assembly 330'.

Figure 12:
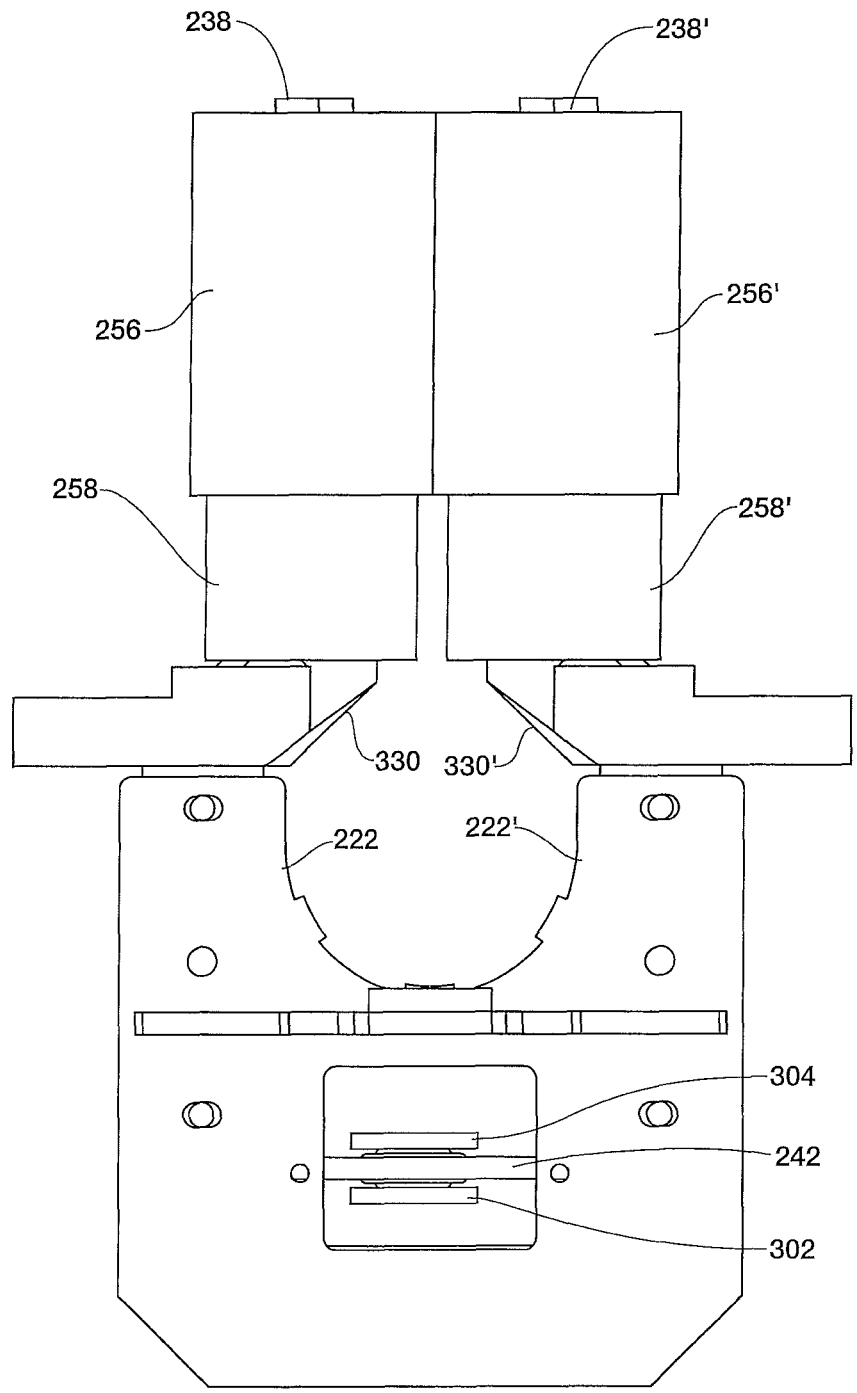
FIG. 12 is an enlarged side perspective view of an isolated opposed motor roller assembly, with elements omitted for clarity.

FIG. 12 illustrates an isolated opposed motor roller assembly embodiment having second shafts 238, 238' which pass through the pivot block assemblies 330,330'. Each pivot block assembly 330,330' includes frictional surfaces 258, 258' at the end nearest the pivot block assemblies 330,330' thereby engaging drive belts 262, 262' and outer elastomeric surfaces 256, 256'. Further, at least one link may be affixed to one of the pivot block assemblies 330,330'. Similarly, a second link may be affixed to the other pivot block assembly 330,330'. For instance, as seen in FIG. 12, a first link 302 and a second link 304 may be positioned on the corresponding pivot block assemblies 330,330'. In some examples, first link 302 and/or a second link 304 may be motor adjustment links. Other examples include a variety of additional intermittent linkage.

Figure 13A:
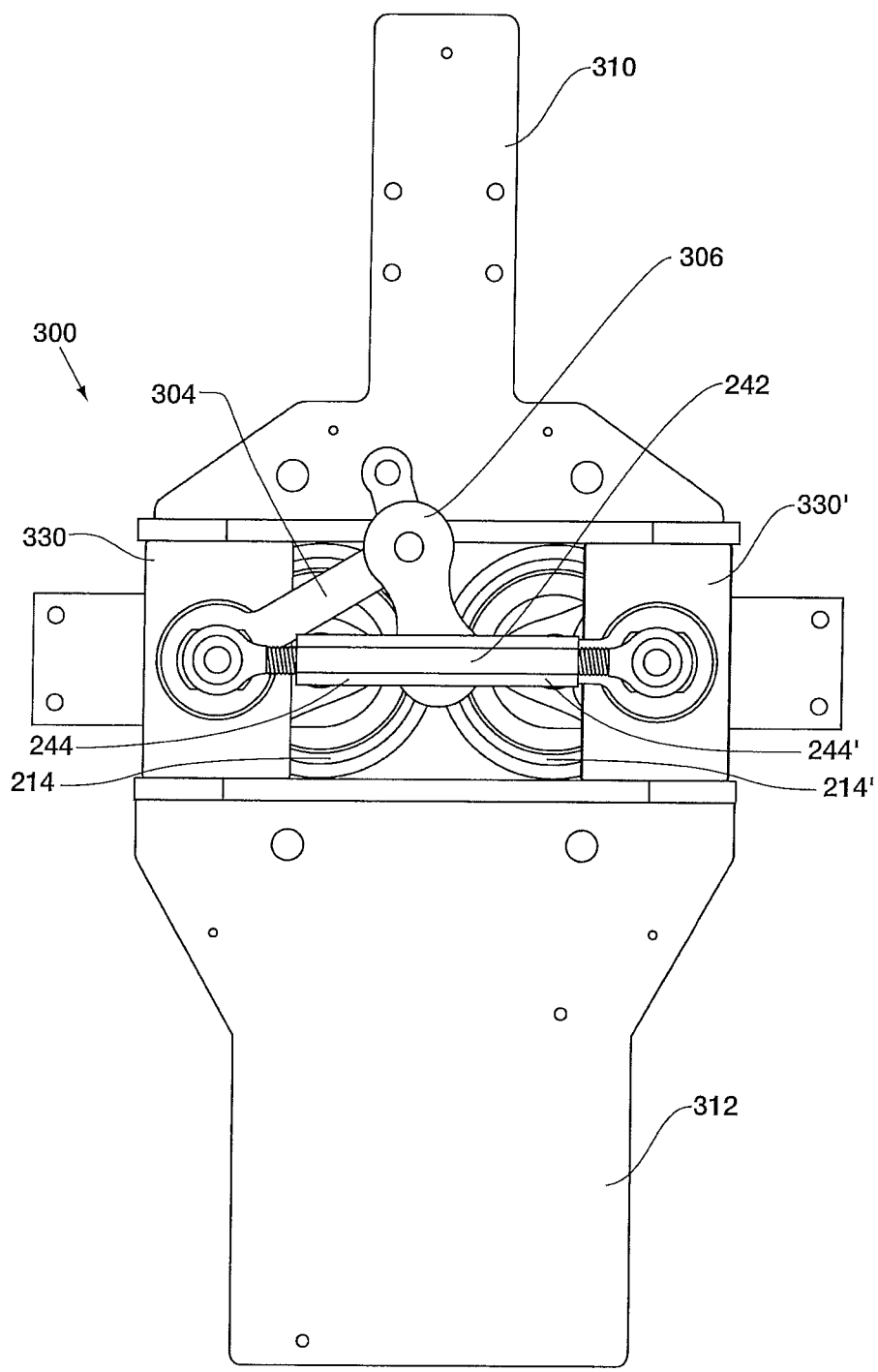
FIG. 13a is an enlarged bottom view of a self-tensioning adjustment assembly and opposed motor roller assembly, with elements omitted for clarity.

FIG. 13*a* shows one embodiment of self-tensioning adjustment assembly 300 and opposed motor roller assembly 210 in an operating position. Self-tensioning adjustment assembly 300 includes first link 302 (see FIG. 13B), second link 304 and connecting linkage to generally position the pair of pivot block assemblies, i.e. first pivot block assembly 330 and second pivot block assembly 300', in alignment with one-another. In yet some other examples, the connecting linkage is a connecting roller link 306, thereby coupling at least one motor adjustment link to a second link as shown in FIG. 13A.

Figure 13B:
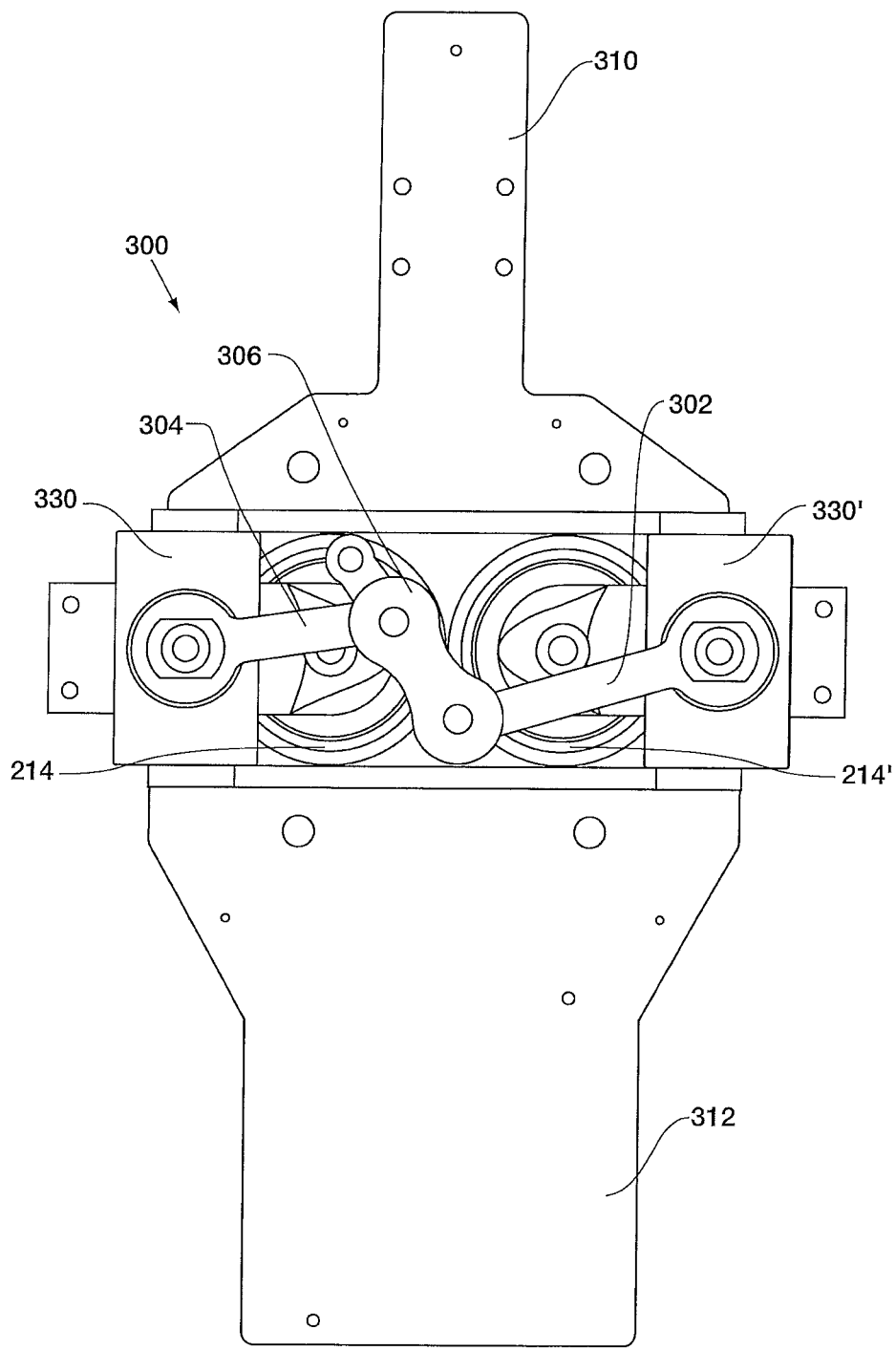
FIG. 13b is an enlarged bottom view of a self-tensioning adjustment assembly and opposed motor roller assembly, with elements omitted for clarity, in a second maintenance position.

FIG. 13*b* shows self-tensioning adjustment assembly 300 and opposed motor roller assembly 210 in one embodiment of a second, maintenance position. Here, first link 302, second link 304 and connecting roller link 306 tie movement of the pivot block assemblies, and associated rollers, together. As shown in this second, maintenance position, each pivot block assembly is positioned adjacent from a centerline and one-anther simultaneously in a mirroring fashion, for instance in the direction of the directional arrows indicated in FIG. 13B. This second position may be beneficial for maintenance, assembly, reassembly or the like.

Figure 14:
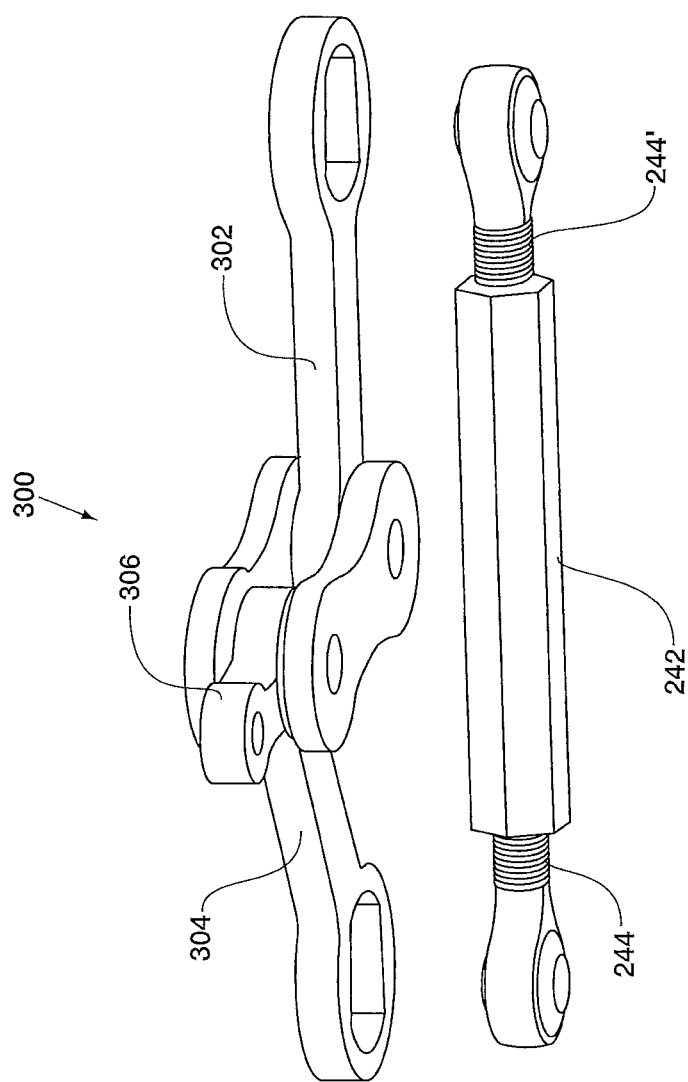
FIG. 14 is an enlarged side perspective view of isolated elements in the self-tensioning adjustment assembly, with elements omitted for clarity.

FIG. 14 illustrates certain isolated elements in self-tensioning adjustment assembly 300. For instance, self-tensioning adjustment assembly 300 may include first link 302, second link 304 and connecting roller link 306 to couple the first link 302 second link 304 in a self-centering movement so that movement of each pivot block assembly mirrors movement of the other pivot block assembly.

Figure 15:
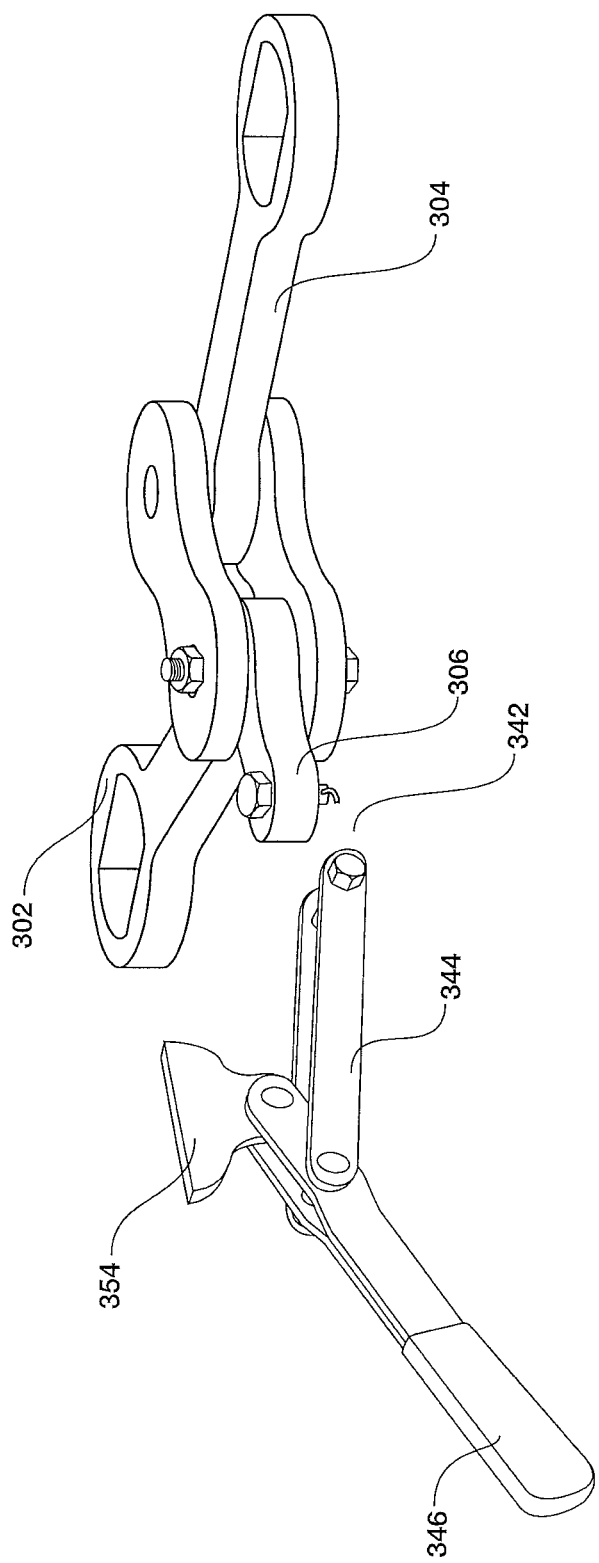
FIG. 15 is another enlarged side perspective view of isolated elements in the self-tensioning adjustment assembly, with elements omitted for clarity.

FIG. 15 further shows isolated elements in self-tensioning adjustment assembly 300. Here, lever 346 is connected to self-tensioning adjustment assembly 300 and is adapted to adjust pivot block assemblies 330,330'. For instance, lever 346 mirrors each pivot block assembly about the other pivot block assembly. Self-tensioning clamp plate 310 may support lever 346. In some examples, self-tensioning clamp plate 310 includes mounting bracket 354 connecting a proximate end of lever 346 to self-tensioning clamp plate 310. A lever retainer may affix lever 346 to self-tensioning clamp plate 310 to retain a distal handling end of lever 346 in an operating position. As shown in FIG. 15, coupling arm 344 may connect lever 346 and the connecting roller link 306. Further, a spring assembly 342 may be positioned and connect coupling arm 344 and connecting roller link 306. As also shown in FIG. 11, spring assembly 342 may include spring 350 connected to self-tensioning clamp plate 310 by a spring linkage.

The drive roller assemblies 214, 214' are generally cylindrical and are made of aluminum or other light-weight alloy. They each have frictional surfaces 258, 258' at the end nearest the pivot block assemblies 330,330' for engaging drive belts 262, 262' and outer elastomeric surfaces 256, 256' of about ¼" thickness on most of the remainder of the surface. The frictional surface 258 is preferably a series of circumferential grooves that mate with the drive belt 262. The drive belt may be a poly v-belt. The outer elastomeric surface is preferably polyurethane with a durometer value (Shore Type A) between about 60 and about 90.

In addition, as discussed above, pairs of LIMB, spaced at 80 feet intervals and operated at 480 volts, draws about 15 amps. This is about 90 watts per foot of sorter for about 70 pounds of thrust. Also, a prior art chain drive would draw about 15 watts per foot of sorter for about 1500 pounds of thrust. To the contrary, the present inventions drive rollers are spaced at 160 feet intervals, operate at 480 volts and draw only about 4 amps. This is only about 12 watts per foot of sorter for about 100 pounds of thrust.

Additionally, it is contemplated that the tilt mechanism 50 and the tilt sensor 140 could be adapted for use in conjunction with a dual axis tipping cart as seen in FIGS. 8, 8a, 9 and 9a. Mounting a tilt mechanism 50 to a dual axis tipping cart may include mounting the tilt mechanism to accommodate for the angled pivot structure 58. For dual axis tipping, the pivot axis 62 lies in a vertical plane parallel to the conveyor line of travel, which is shown in the drawings as horizontal line 64. However, unlike other sorter conveyor tilting carts, the pivot axis 62 of the conveyor cart 20 of the present inventions is disposed at an angle θ to the conveyor line of travel 64 so as to impart two axial components to the tilting of the carrying tray 40. In this embodiment, the pivot axis 62 is angled downwardly at an angle of approximately 20 to 45 degrees below horizontal in a forward direction. The pivot axis 62 as shown is angled downwardly 30 degrees and the pivot axis 62 intersects a plane occupied by the carrying tray 40 rearward of the center of the tray 40.

By disposing the pivot axis 62 at a downwardly directed angle θ instead of parallel to the conveyor line of travel 64, two axial components are imparted to the tilting motion of the carrying tray 40. The first axial component of the tray's tilting motion is lateral tipping on a horizontal axis parallel to the conveyor line of travel 64. The second axial component of the tray's tilting motion is rotating around a vertical axis 66 perpendicular to the conveyor line of travel. Thus, while the tray only tilts along a single, angled pivot axis 62, the overall motion of the tray 40 as it tilts includes two axial components.

The tilting motion of the tray may also be described using three-dimensional X, Y, and Z-axis spatial coordinates, as shown in FIG. 9A, wherein the Y-axis is parallel to the conveyor line of travel 64, the X-axis extends horizontally perpendicular to the line of travel 64, and the Z-axis extends vertically perpendicular to the line of travel 64. In one embodiment, tilting of the tray 40 includes a Y-axis and a Z-axis component, for as shown in FIG. 9A the pivot axis 62 intersects the Y and Z axes. Specifically and for illustrative purposes only, using the preferred 37.5 degree downward angle θ of the pivot axis 62, it can be appreciated that the ratio of Y-axis motion to Z-axis motion is 60:30. In other words, with a 30 degree angle θ, the tray 40 laterally tips somewhat farther than it rotates. If the angle θ of the pivot axis 62 is increased to 45 degrees below horizontal, then the tray will tilt and rotate equally.

Figure 6:
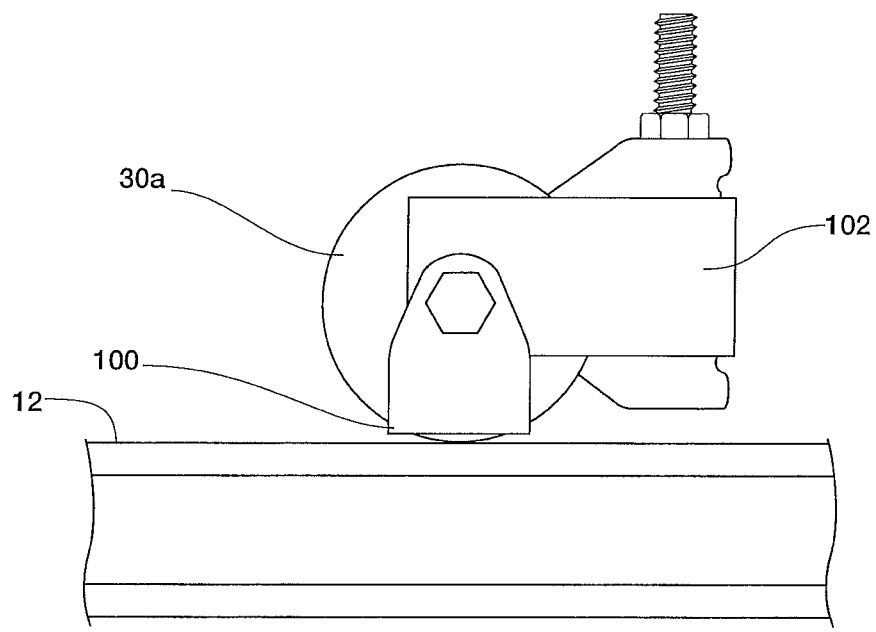
FIG. 6 is a side view of one example of a wear guard and height detection module according to an embodiment of the present inventions.
Figure 7:
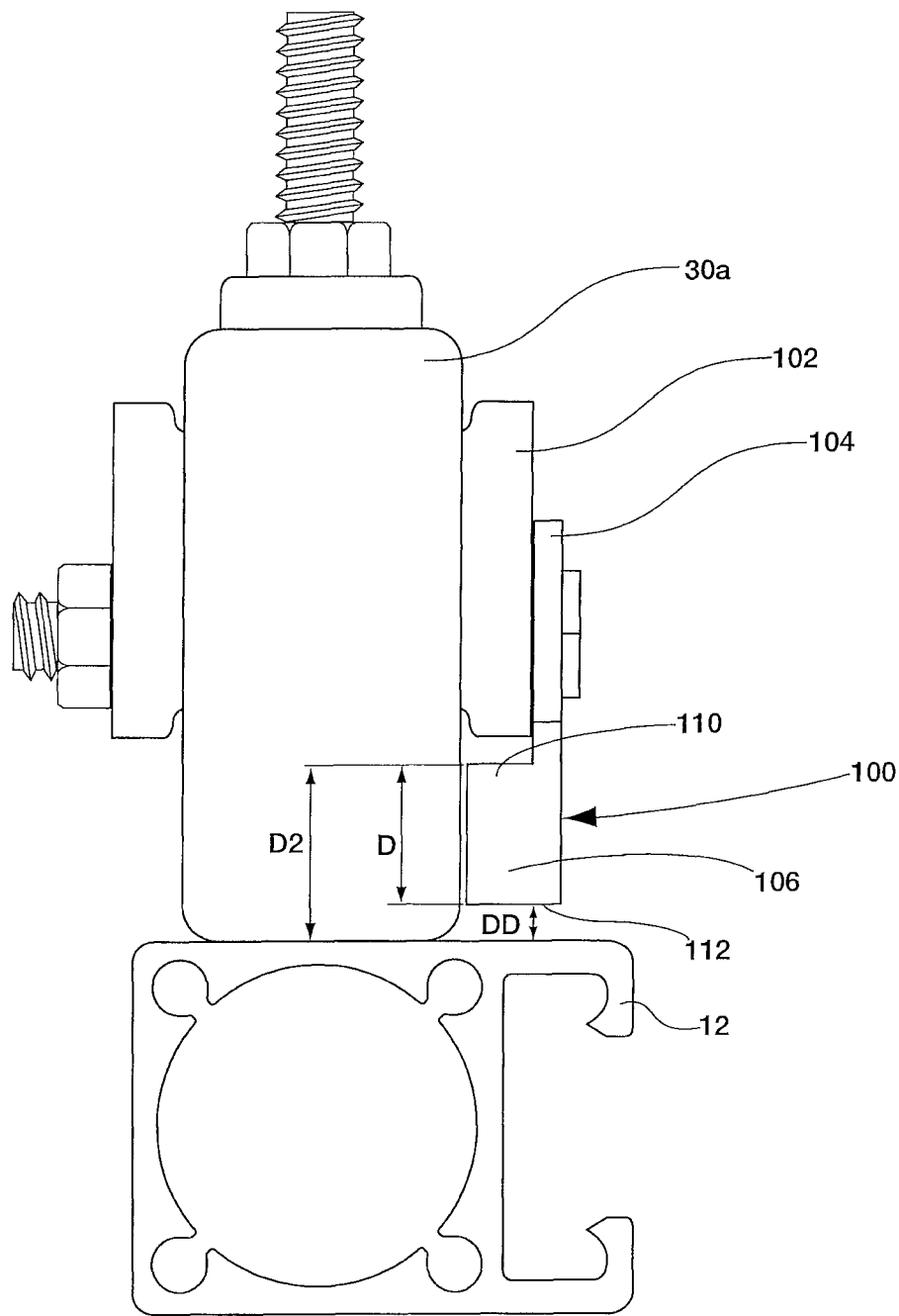
FIG. 7 is a back view of one example of a wear guard and height detection module according to an embodiment of the present inventions.

FIGS. 6 and 7 show a wear guard 100 for preventing track wear in the event of a wheel failure. In some examples, a carrier 25 (shown in FIG. 2), including a plurality of wheels, has at least one wear guard 100 associated with an axel support 102 for preventing track wear in the event of a wheel failure. The wear guard 100 may be removably secured to the axel support in some examples and in other examples may be part of or attached to the axel support at various angles or attachment sites. The wear guard 100, in some examples, includes an arm 104 for securing the wear guard to the axle support 102. The wear guard 100 may also include a shoulder 106 adapted to separate the axle support apart from the track in the event of wheel failure. In some instances, the arm 104 and the shoulder 106 form an L-shape with the shoulder projecting from the arm and toward the wheel substantially perpendicularly. The shoulder 106 may include a shoulder first side 110 and a shoulder second side 112. The shoulder second side 112 may be a bearing material. In one example, the shoulder second side may be nylon. The shoulder 106 may be the same material as the arm 104. The shoulder 106, in other examples, may be made of a different material than the arm 104.

In one example, the wear guard 100 typically attaches to the axel support near that wheel so that wear guard 100 is carried around the track 12 but is not in contact with the track while the wheel 30a is intact. The wear guard 100 generally includes at least one portion with a length D. Length D is less than a length D2. The length D2 includes the length D plus a distance DD. Distance DD is the distance between the bottom of the wear guard 112 and the track 12. In the event of wheel failure, the wheel 30a typically will rupture, dislodging from the axel. Without the wheel support, and without a wear guide 100, portions of the conveyor may lower to the track and drag if the sortation conveyor continues operation. With the wear guide 100 in place, the conveyor remains separated from the track 12 even absent the tire. With the wheel absent, the wear guide 100 lowers the drop distance DD to contact the track and space apart the track and the conveyor, typically maintaining slightly less than the usual positioning of when the tire is in place and functioning.

The wear guide 100 maintains positioning for a period of time to allow scheduling maintenance to repair the ruptured tire. In one embodiment, about a 0.15 to about a 0.20 static coefficient of friction results from a contact between the second side 112 and the track 12. In one example, the wear guide 100 is able to maintain a separation between the track and the axel support 102 for substantially 5 hours. In other examples the wear guide 100 is able to maintain a separation between the track and the axel support 102 for substantially 8 hours. In other examples the wear guide 100 is able to maintain a separation between the track and the axel support 102 for substantially 10 hours or more. The durability of the wear guard 100 allows time to schedule repair, however, remains an inexpensive alternative to risking excessive wear or expensive downtime during a wheel failure.

The wear guide 100 may take on varying shapes and sizes. The wear guide 100, by way of example, may be a skid plate, a secondary rail, a rotary insert, a slide, and/or a rolling material or wheel.

The sorting conveyor 10 may also include a track wear prevention system including the wear guard 100 and a height detection module. The wear guard 100 inhibits track wear when the module detects a wheel failure and a notification is sent to the conveyor control system that a wheel failure has occurred. The wear guard 100 supports the axel support and conveyor so that the conveyor parts, such as the axel support does not contact the rail during a wheel failure. However, enough drop distance is allowed by the wear guide 100 that a drop or height change is able to be detected by the height detection module.

In one example, the height detection module is adapted to sense a change in an axle positioning that is outside a predetermined tolerance zone of about 0.063 to about 0.25 inches. In other examples, the height detection module is adapted to sense when said axle positioning is outside of an operating range of about 0 to about 0.125". In some instances, the height detection module is adapted to recognize a positional deviation of the axel support. The height detection module may also be adapted to sense when the axle support is outside of an operating range of about 0 to about 0.125 inches.

The height detection module may include a sensor, one example of which is seen in FIG. 8. The sensor may, for example, be attached to the track, and/or the conveyor cart or a stationary mount. The sensor may, by way of example, be an infrared sensor. The sensor may relay an axel sensor, a change in axel support height and/or a wheel failure to the height detection module. The height detection module may be a part of or in communication with a conveyor control system. The height detection module may send a warning to the conveyor control system indicating that a wheel failure has occurred. A warning signal, such as a light or sound, may also be activated by the height detection module to indicate a wheel failure has been detected.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A sorting conveyor for transporting objects and unloading objects at one or more unloading stations adjacent the conveyor, said sorting conveyor comprising:
    (a) a conveyor track;
    (b) a train of conveyor carts; and
    (c) at least one of said conveyor carts including
        (i) a frame base for engaging said conveyer track,
        (ii) a conveying surface for holding the objects,
        (iii) a support for supporting said conveying surface above said frame base, and
        (iv) a carrier having a plurality of wheels interfacing with said track and having at least one wear guard associated with an axle support for preventing track wear in the event of a wheel failure, and
    (d) a track wear prevention system including said wear guard having an arm for securing said wear guard to said axle support, and a height detection module wherein said wear guard inhibits track wear when said module detects a wheel failure,
    (e) wherein said wear guard includes a shoulder adapted to separate said axle support apart from said track, said shoulder including a first side and a second side, and a distance D between said first side and said second side, with the distance D being less than a second distance D2 between said axle support and said track.

2. In a sorting conveyor for transporting objects and unloading objects at one or more unloading stations adjacent the conveyor, said sorting conveyor having a conveyor track and a train of interconnected conveyor carts, at least one of said conveyor carts comprising:
    (a) a frame base for engaging said conveyer track;
    (b) a conveying surface for holding said objects;
    (c) a conveyor support for supporting said conveyor surface above said frame base;
    (d) a carrier having a plurality of wheels and at least one wear guard associated with an axle support for preventing track wear in the event of a wheel failure; and
    (e) a track wear prevention system including said wear guard having an arm for securing said wear guard to said axle support, and a height detection module wherein said wear guard inhibits track wear when said module detects a wheel failure;
    (f) wherein said wear guard includes a shoulder adapted to separate said axle support apart from said track, said shoulder including a first side and a second side, said second side being a bearing material, and contact between said second side and said track results in a static coefficient of friction of about 0.15 to about 0.20.

3. The apparatus according to claim 2, wherein said arm and said shoulder form an L-shape with said shoulder projecting from said aim and toward said wheel substantially perpendicularly.

4. The apparatus according to claim 3, wherein said rail is a guide rail.

5. The apparatus according to claim 2, wherein said shoulder includes a distance D between said first side and said second side.

6. The apparatus according to claim 2 wherein said wear guard is a wheel.

7. In a sorting conveyor for transporting objects and unloading objects at one or more unloading stations adjacent the conveyor, said sorting conveyor having a conveyor track and a train of interconnected conveyor carts, at least one of said conveyor carts comprising:
    (a) a frame base for engaging said conveyer track;
    (b) a conveying surface for holding said objects;
    (c) a conveyor support for supporting said conveyor surface above said frame base;
    (d) a carrier having a plurality of wheels and at least one wear guard associated with an axle support for preventing track wear in the event of a wheel failure; and
    (e) a track wear prevention system including said wear guard having an arm for securing said wear guard to said axle support, and a height detection module wherein said wear guard inhibits track wear when said module detects a wheel failure;
    (f) wherein said wear guard includes a shoulder adapted to separate said axle support apart from said track, said shoulder including a first side and a second side, and a distance D between said first side and said second side, with the distance D being less than a second distance D2 between said axle support and said track.

8. The apparatus according to claim 7, including a drop distance DD between said second side and said track.

9. The apparatus according to claim 8, wherein said height detection module is adapted to recognize a change in axle positioning.

10. The apparatus according to claim 9, wherein said change in axle positioning is limited to about less than D2.

11. The apparatus according to claim 9, wherein said change in axle positioning is less than about DD.

12. The apparatus according to claim 11, wherein said height detection module is adapted to sense a change in an axle positioning that is outside a predetermined tolerance zone of about 0.063 to about 0.25 inches.

13. The apparatus according to claim 11, wherein said height detection module is adapted to sense when said axle positioning is outside of an operating range of about 0 to about 0.125".

14. The apparatus according to claim 11, wherein said height detection module is adapted to recognize a positional deviation of said axle support.

15. The apparatus according to claim 11, wherein said height detection module is adapted to sense when said axle support is outside of an operating range of about 0 to about 0.125 inches.

16. The apparatus according to claim 9, wherein said height detection module includes a sensor attached to said track.

17. The apparatus according to claim 16, wherein said sensor is an infrared sensor.

18. The apparatus according to claim 17, wherein said axle height detection module is in communication with a conveyor control system.

* * * * *

UNITED STATES PATENT AND TRADEMARK OFFICE
CERTIFICATE OF CORRECTION

PATENT NO. : 10,160,606 B2
APPLICATION NO. : 15/507632
DATED : December 25, 2018
INVENTOR(S) : Erceg et al.

Page 1 of 1

It is certified that error appears in the above-identified patent and that said Letters Patent is hereby corrected as shown below:

In the Specification

In Column 11, Line 18, --LIMB-- should be "LIMs"

In the Claims

In Column 14, Line 36, --air-- should be "arm"

Signed and Sealed this
Nineteenth Day of February, 2019

Andrei Iancu
*Director of the United States Patent and Trademark Office*